US008165527B2

(12) United States Patent
Sims et al.

(10) Patent No.: US 8,165,527 B2
(45) Date of Patent: Apr. 24, 2012

(54) SYSTEM AND METHOD FOR SHORT-RANGE COMMUNICATION FOR A VEHICLE

(75) Inventors: Michael J. Sims, Zeeland, MI (US); Carl L. Shearer, Hudsonville, MI (US); Steven L. Geerlings, Holland, MI (US); Todd R. Witkowski, Zeeland, MI (US); Paul S. Vanlente, Holland, MI (US); Ted W. Ringold, Hudsonville, MI (US); James E. Trainor, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 513 days.

(21) Appl. No.: 12/438,723

(22) PCT Filed: Aug. 24, 2007

(86) PCT No.: PCT/US2007/076814

§ 371 (c)(1), (2), (4) Date: Feb. 24, 2009

(87) PCT Pub. No.: WO2008/025007

PCT Pub. Date: Feb. 28, 2008

(65) Prior Publication Data

US 2010/0240307 A1 Sep. 23, 2010

Related U.S. Application Data

(63) Continuation-in-part of application No. 11/511,071, filed on Aug. 28, 2006, now Pat. No. 7,911,358.

(60) Provisional application No. 60/840,153, filed on Aug. 25, 2006, provisional application No. 60/876,885, filed on Dec. 22, 2006.

(51) Int. Cl.
*H04B 7/00* (2006.01)

(52) U.S. Cl. ...................................... 455/41.3; 455/345

(58) Field of Classification Search ........................ None
See application file for complete search history.

(56) References Cited

U.S. PATENT DOCUMENTS

| | | | |
|---|---|---|---|
| 4,543,957 | A | 10/1985 | Friedman et al. |
| 5,414,426 | A | 5/1995 | O'Donnell et al. |
| 5,550,930 | A | 8/1996 | Berman et al. |
| 5,583,844 | A | 12/1996 | Wolf et al. |
| 5,614,885 | A | 3/1997 | Van Lente et al. |

(Continued)

FOREIGN PATENT DOCUMENTS

CA 2295975 A1 12/1999

(Continued)

OTHER PUBLICATIONS

Office Action for U.S. Appl. No. 11/511,071 dated Jun. 10, 2010, 16 pages.

(Continued)

*Primary Examiner* — Cassandra Cox
(74) *Attorney, Agent, or Firm* — Foley & Lardner LLP

(57) ABSTRACT

A system for communicating information and/or instructions includes a transmitter and receiver configured for wireless communication with a user interface. The information and/or instructions may be audibly communicated to the user. The system includes voice activation and controls. The wireless communication may utilize Bluetooth communication protocol.

20 Claims, 33 Drawing Sheets

U.S. PATENT DOCUMENTS

| | | | | |
|---|---|---|---|---|
| 5,646,701 | A | 7/1997 | Duckworth et al. | |
| 5,689,245 | A | 11/1997 | Noreen et al. | |
| 5,793,300 | A | 8/1998 | Suman et al. | |
| 5,893,920 | A | 4/1999 | Shaheen et al. | |
| 6,091,343 | A | 7/2000 | Dykema et al. | |
| 6,271,765 | B1 | 8/2001 | King et al. | |
| 6,326,889 | B1 | 12/2001 | Van Horn et al. | |
| 6,392,534 | B1 | 5/2002 | Flick | |
| 6,563,430 | B1 | 5/2003 | Kemink et al. | |
| 6,580,838 | B2 | 6/2003 | Oliver et al. | |
| 6,877,097 | B2 | 4/2005 | Hamid et al. | |
| 7,161,466 | B2 | 1/2007 | Chuey | |
| 7,346,374 | B2 * | 3/2008 | Witkowski et al. | 455/569.2 |
| 2002/0075133 | A1 | 6/2002 | Flick | |
| 2002/0186144 | A1 | 12/2002 | Meunier | |
| 2002/0190872 | A1 | 12/2002 | Suman et al. | |
| 2002/0197954 | A1 | 12/2002 | Schmitt et al. | |
| 2003/0053378 | A1 | 3/2003 | Lovin et al. | |
| 2004/0001095 | A1 | 1/2004 | Marques | |
| 2004/0048622 | A1 | 3/2004 | Witkowski et al. | |
| 2004/0061591 | A1 | 4/2004 | Teich | |
| 2005/0024185 | A1 | 2/2005 | Chuey | |
| 2005/0242970 | A1 | 11/2005 | Blaker et al. | |
| 2006/0153383 | A1 | 7/2006 | Bejean | |
| 2006/0279399 | A1 | 12/2006 | Chuey | |
| 2007/0057810 | A1 | 3/2007 | Bos et al. | |
| 2007/0149189 | A1 | 6/2007 | Yang et al. | |
| 2008/0022323 | A1 | 1/2008 | Koo | |

FOREIGN PATENT DOCUMENTS

| | | | |
|---|---|---|---|
| EP | 1 176 392 | A1 | 1/2002 |
| EP | 1 202 525 | A | 5/2002 |
| EP | 1 202 525 | B1 | 3/2006 |
| GB | 2 362 681 | A | 11/2001 |
| JP | 2001-238274 | A | 8/2001 |
| JP | 2002-186055 | A | 6/2002 |
| JP | 2002-517643 | | 6/2002 |
| JP | 4227105 | | 2/2009 |
| WO | WO 94/02920 | A1 | 2/1994 |
| WO | WO 99/63308 | A1 | 12/1999 |
| WO | WO 00/75905 | A1 | 12/2000 |
| WO | WO 01/28187 | A1 | 4/2001 |
| WO | WO 03/056531 | A1 | 7/2003 |
| WO | WO 2004/034352 | A1 | 4/2004 |
| WO | WO 2005/043484 | A1 | 5/2005 |
| WO | WO 2008/025007 | A2 | 2/2008 |
| WO | WO 2008/027830 | A2 | 3/2008 |

OTHER PUBLICATIONS

International Search Report and Written Opinion for International Patent Application No. PCT/US2007/076880, mailed Mar. 31, 2008, 11 pages.

International Search Report for International Patent Application No. PCT/US03/31977, mailed Feb. 5, 2004, 27 pages.

Notification of Reason(s) for Refusal for Japanese Patent Application No. 2004-543578, Dispatch Date Oct. 30, 2007, 2 pages.

US Office Action for U.S. Appl. No. 11/511,071 dated Oct. 15, 2009, 16 pages.

Office Action for European Application No. 07841366.3, dated May 12, 2010, 7 pages.

Office Action for European Application No. 07841394.5, dated May 4, 2010, 6 pages.

Office Action for U.S. Appl. No. 10/530,588, dated Dec. 9, 2008, 21 pages.

Office Action for U.S. Appl. No. 10/530,588, dated Sep. 20, 2007, 16 pages.

Lind, R., Schumacher, R., Reger, R., Olney, R., Yen, H., and Laur, M., “The Network Vehicle—A Glimpse Into the Future of Mobile Multi-Media”, Digital Avionics Systems Conference, Oct. 31-Nov. 7, 1998; pp. 121-1-121-8; vol. 2, R. Freeman, IBM Corporation, White Plains, New York.

International Search Report and Written Opinion for International Application No. PCT/US2007/076814; mailing date Mar. 27, 2008; 8 pages.

EP Office Action for 07 841 366.3 dated Dec. 22, 2011, 5 pages.

* cited by examiner

| | |
|---|---|
| Idle | 230 |
| To begin programming the system, press and hold the button you would like to program. | 232 |
| Please refer to the vehicle owner's manual for safety precautions. | 234 |
| Continue holding these buttons to reset the system, which will permanently erase all program settings. | 236 |
| All programmed settings have been erased. | 238 |
| Main A | 240 |
| This is the wireless control system that can be programmed to operate garage door openers, gate operators and other compatible devices. To learn more, visit our website. | 242 |
| To begin programming the system, select Program from the next menu. | 244 |
| Options are Activate, Program, Erase, Edit, and List. | 246 |
| Main B | 250 |
| Is not programmed. | 252 |
| Available options are Activate, Program, Edit, Erase, List, Go Back, Cancel and Hands Free Help. | 254 |
| Activate A | 260 |
| Which button would you like to activate? | 262 |
| Which device or button would you like to activate? | 264 |
| Available options are a device name, List, Button 1, Button 2, Button 3…, Go Back, Cancel and Hands Free Help. | 266 |
| Activate B | 270 |
| Activating. | 272 |
| Program A | 280 |
| Press and hold the hand held transmitter button until the system has been programmed. | 274 |
| No remote control signal was found. | 276 |
| Program B | 290 |
| The system has been programmed. | 292 |
| What name would you like to assign to this device? | 294 |
| Available options are the Name for the Programmed Device, Go Back, Cancel and Hands Free Help. | 296 |

FIG. 5A

| | |
|---|---|
| Program C | 300 |
| Which button number would you like to associate with <tag>? | 302 |
| Available options are 1, 2, 3…, Go Back, Cancel, and Hands Free Help. | 304 |
| Program D | 310 |
| To determine if any additional programming steps are needed, use the Activate command or press <tag>. | 316 |
| HL Program E | 320 |
| Did the device operate? | 322 |
| Button 1 has been saved. | 324 |
| Button 2 has been saved. | 325 |
| Button 3 has been saved. | 326 |
| <tag>…has been saved for Button 1. | 327 |
| <tag>…has been saved for Button 2. | 328 |
| <tag>…has been saved for Button 3. | 329 |
| Program F | 340 |
| Please try programming the system again. | 345 |
| Program G | 350 |
| Locate the Learn button on your garage door opener motor or other device and press it. You will then have approximately 30 seconds to return to your vehicle and press the button two times. | 352 |
| Would you like to hear these instructions again? | 354 |
| Program H | 360 |
| Would you like to hear this message again? | 362 |
| Please call customer service or visit our website for assistance. | 364 |
| Program J | 370 |
| Would you like to dial this number now? | 372 |
| Edit A | 380 |
| Which wireless control system device would you like to edit? You can also say Button 1, Button 2, or Button 3. | 382 |
| Available options are the wireless control system device to be edited, Button 1, Button 2, Button 3, List, Go Back, Cancel and Hands Free Help. | 384 |
| Edit B | 390 |
| <input> has been saved. | 386 |
| Available options are a new name for the device, Go back, Cancel and Hands Free Help. | 388 |

FIG. 5B

| | |
|---|---|
| List A | 400 |
| Button 1. | 402 |
| Button 2. | 404 |
| Button 3. | 406 |
| List B | 410 |
| Available options are Activate, Edit, Erase, Previous, Continue, Go Back, Cancel, and Hands Free Help. | 412 |
| Erase A | 420 |
| Which device would you like to erase? Select "All" to erase all devices. | 422 |
| Availabel options are a device to erase, All, List, Go Back, Cancel, and Hands Free Help. | 424 |
| Erase B | 430 |
| Would you like to erase <input>? | 436 |
| <tag> erased. | 438 |
| All devices have been erased. | 440 |

FIG. 5C

SYSTEM AND METHOD FOR SHORT-RANGE COMMUNICATION FOR A VEHICLE

CROSS-REFERENCE TO RELATED APPLICATIONS

This application claims priority to U.S. Provisional Application No. 60/840,153 entitled "System and Method for Short-Range Communication for a Vehicle" (filed on Aug. 25, 2006), U.S. Provisional Application No. 60/876,885 entitled "System and Method for Short-Range Communication for a Vehicle" (filed on Dec. 22, 2006) and U.S. Non-Provisional application Ser. No. 11/511,071 entitled "System and Method for Enrollment of a Remotely Controlled Device in a Trainable Transmitter" (filed on Aug. 28, 2006) which are herein incorporated by reference in their entirety.

BACKGROUND

HomeLink™ brand Wireless Control System (WCS) allows users to control various wirelessly controlled devices (e.g. garage doors, home lighting, gates, etc.) from a vehicle. Current techniques used for training the WCS involve users holding buttons down based on instructions in an instruction manual.

Bluetooth™-based hands-free systems have been integrated in vehicles to allow a user to initiate and conduct calls in a hands-free manner. The hands-free set in the vehicle may be configured to use some voice prompts to communicate to the user relating to operation of the hands-free phone system. The system may include a microphone integrated in the vehicle and may use the vehicle audio system to output the voice prompts and/or conduct a hands-free phone call.

The Bluetooth communications standard can enable small form factor, low-cost, short range RF links between mobile telephones, notebook computers, PDAs and other portable electronic devices. Bluetooth communication standard may provide secure, wireless communications links between portable electronic devices such as cellular phones, PDAs, computers and other electronic devices. The Bluetooth communications standard is presently an "open" standard that enables short range, secure, RF transmission of voice and/or data information between such portable electronic devices to thus eliminate the need for physical cables for interconnecting the devices. Its implementation is based on a high performance, but low cost, integrated RF transceiver chip set. The Bluetooth standard further provides the potential for automatic and rapid "ad hoc" wireless connections when two or more devices equipped with RF transceivers operating in accordance with the Bluetooth standard come into proximity with each other.

SUMMARY

The present invention relates to a method of providing audible information related to a vehicle system for use in a vehicle. The method includes receiving a command to provide audible information related to the vehicle system; transmitting data related to audible information using a transmitter configured to send the data via a short-range communication protocol based on the command; receiving the data transmitted by the transmitter using a receiver configured to be in communication with the transmitter; and either playing or displaying audible information based on the data received by the receiver using a user interface configured to be in communication with the receiver.

The present invention relates to a method of providing audible information related to a wireless control system. The method includes receiving audible information related to the wireless control system; providing the audible information to a memory unit included in the wireless control system; and providing a user interface configured to play the audible information downloaded to the memory unit.

The present invention relates to a method of providing voice prompts related to a wireless control system that may be used in a vehicle. The method includes receiving a voice prompt related to the wireless control system; storing the voice prompt in memory; and providing a speaker configured to play the voice prompt.

The present invention relates to a vehicle system for use in a vehicle and configured to communicate information to an electronic module, the vehicle system includes a wireless control system; a memory configured to store audible information associated with the wireless control system; and a transmitter provided in a vehicle, coupled to the wireless control system, and configured for short-range wireless communication. The transmitter is configured to send data related to the audible information. A receiver is configured to communicate with the transmitter to transfer the data. A user interface is coupled to the receiver and configured to play audible information related to operation of the wireless control system based on the data received by the receiver.

BRIEF DESCRIPTION OF THE DRAWINGS

FIGS. 5A-C are tables listing example prompts, according an exemplary embodiment.

DETAILED DESCRIPTION

Figure 1:
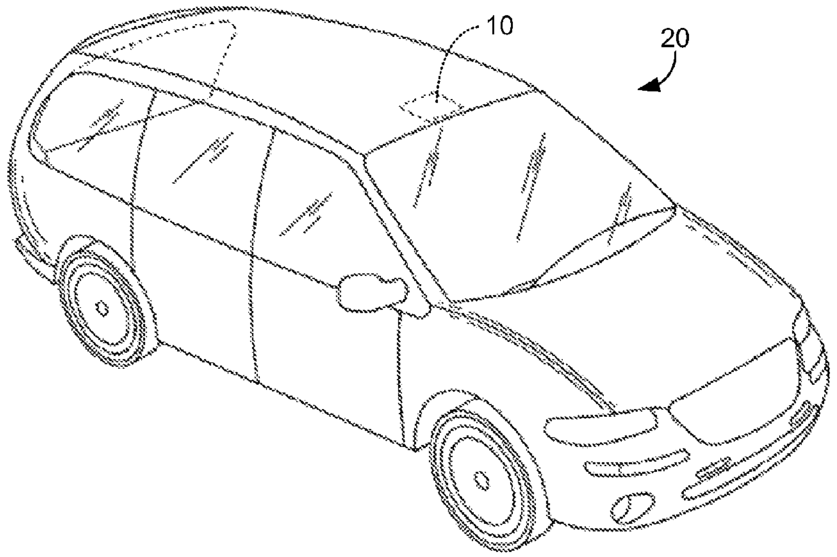
FIG. 1 is a perspective view of a vehicle with vehicle system according to an exemplary embodiment.

With reference to FIGS. 1-6, the various exemplary embodiments disclosed herein are directed broadly to a vehicle system 10 (e.g., a wireless control system ("WCS")). The vehicle system 10 is configured for use in a vehicle 20, as shown in FIG. 1. Audible information may be provided to a user relating to the use of vehicle system 10. Audible information may include user prompts and/or instructions that relate to the vehicle system 10. The audible information can be received wirelessly, pre-recorded and stored in WCS memory, pre-recorded and stored in a user interface system 40 (FIG. 2) memory, etc.

Figure 2:
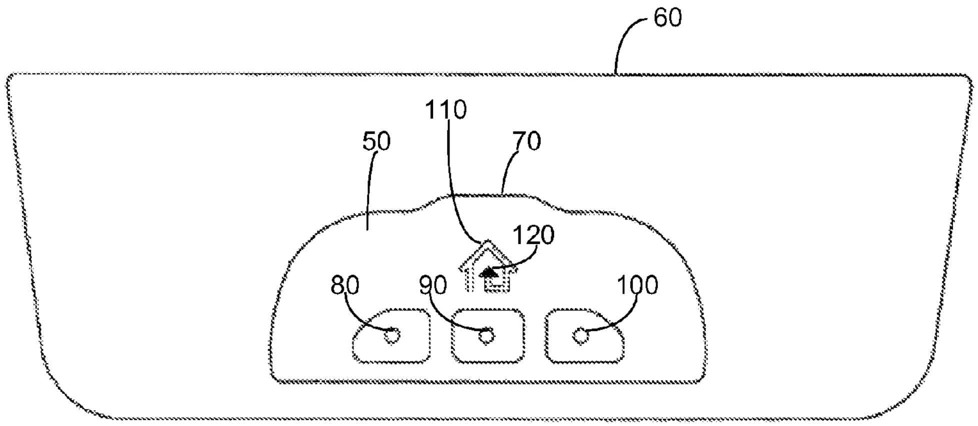
FIG. 2 is a front view of a vehicle system according to an exemplary embodiment.
Figure 3:
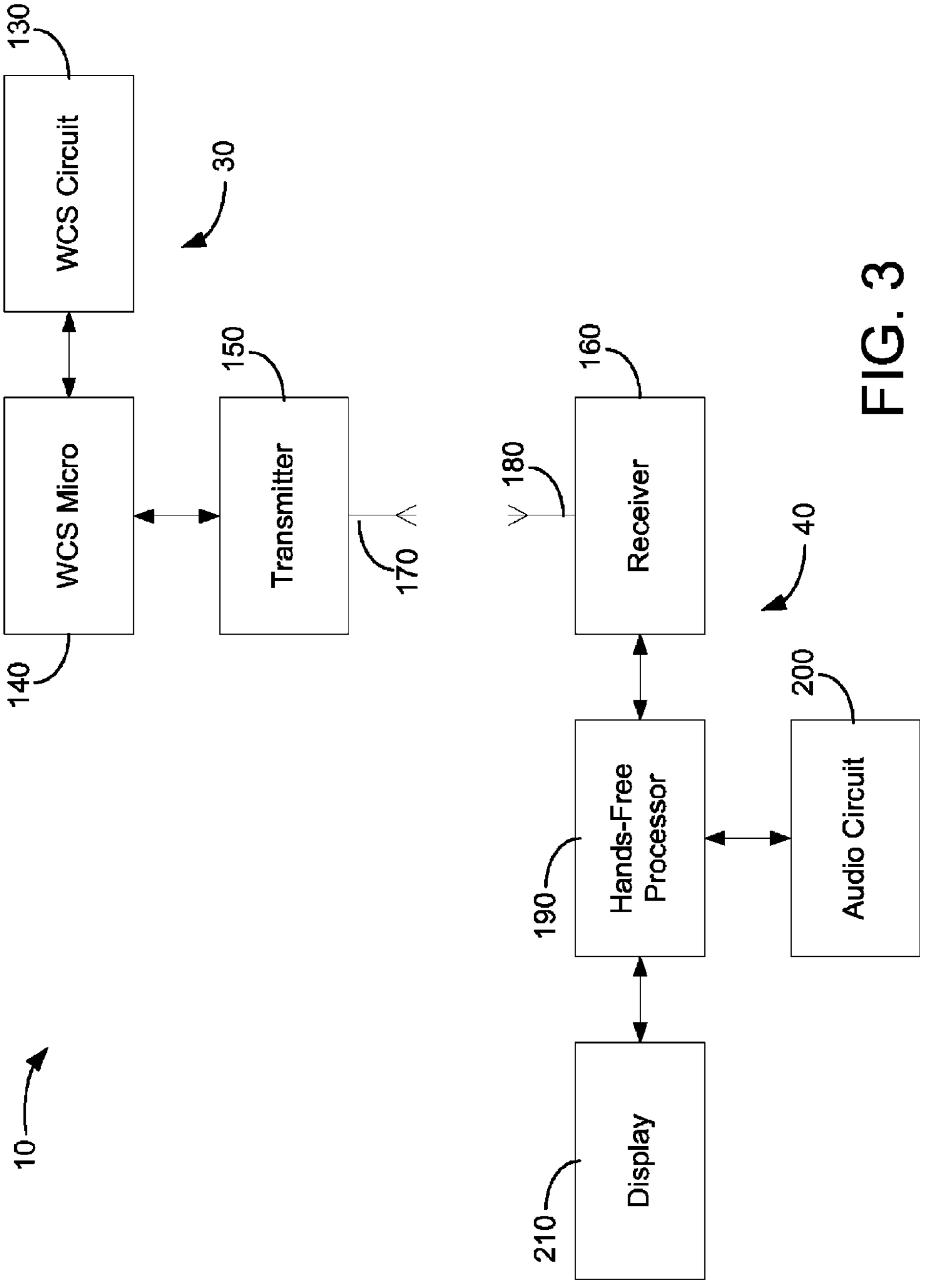
FIG. 3 is a schematic block diagram of a wireless communication system, according to one exemplary embodiment.
Figure 4A:
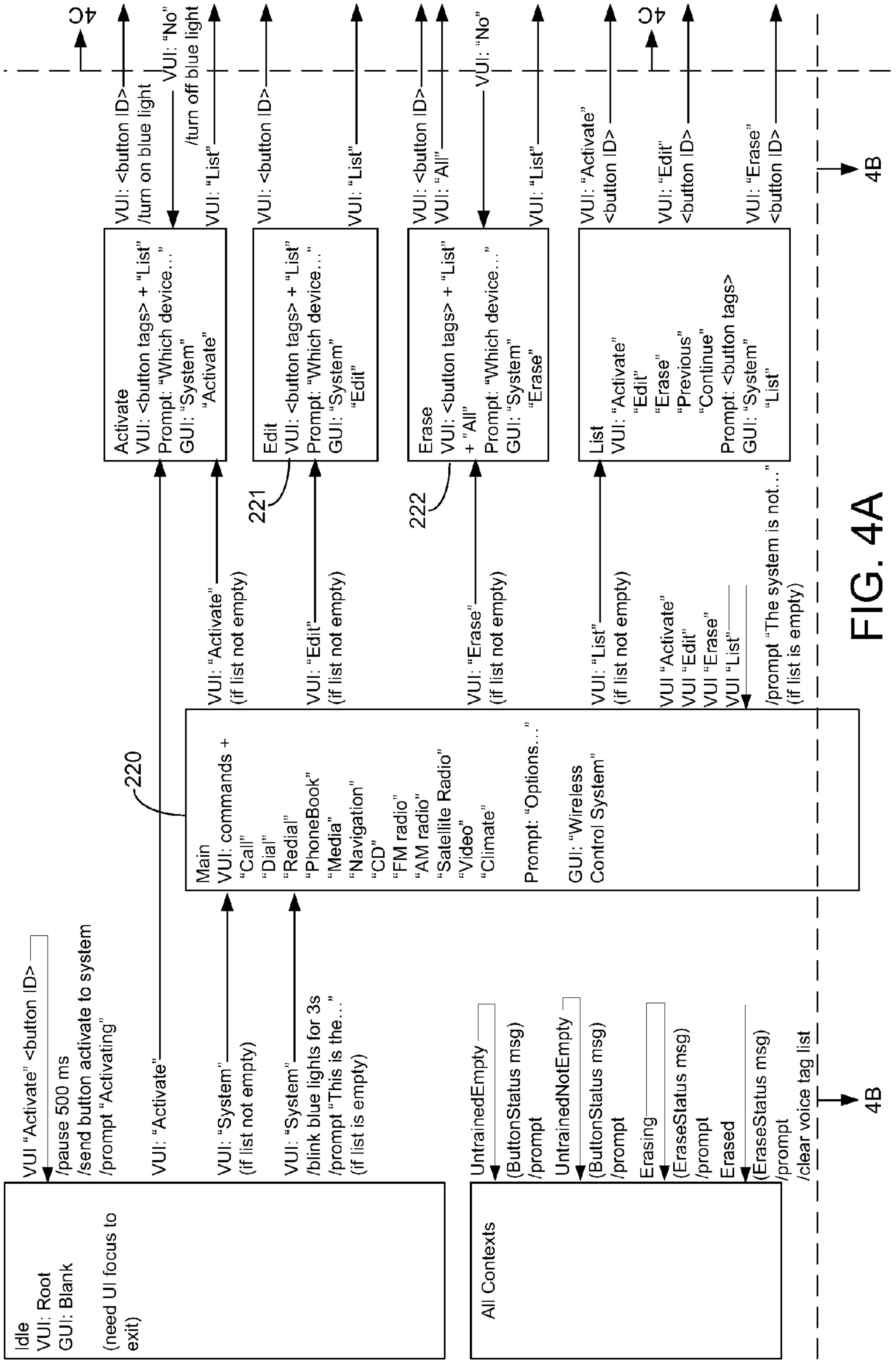
FIGS. 4A-D are sections of a state diagram of an application running the wireless communication system of FIG. 3, according to an exemplary embodiment.
Figure 4B:
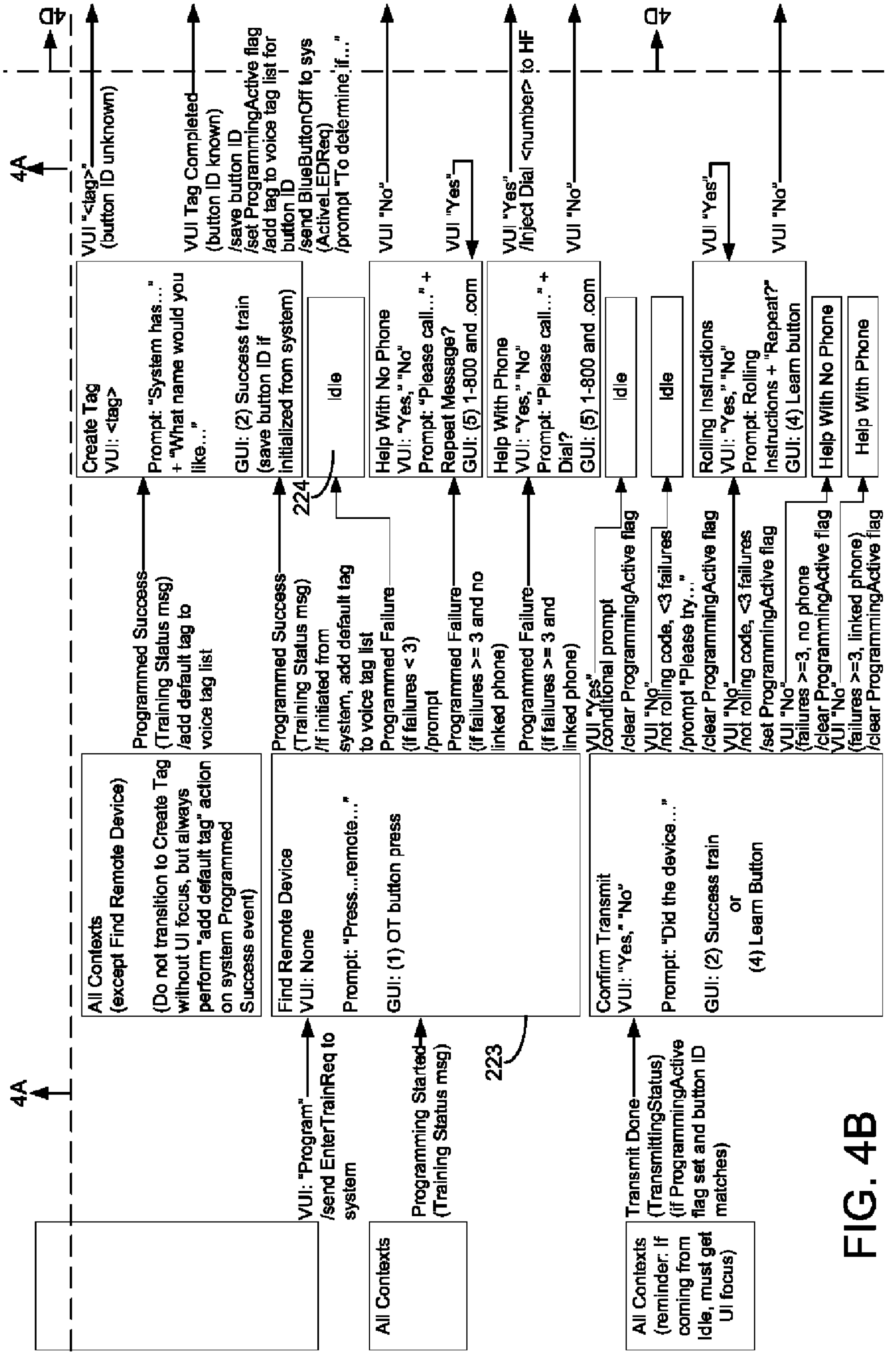
Figure 4C:
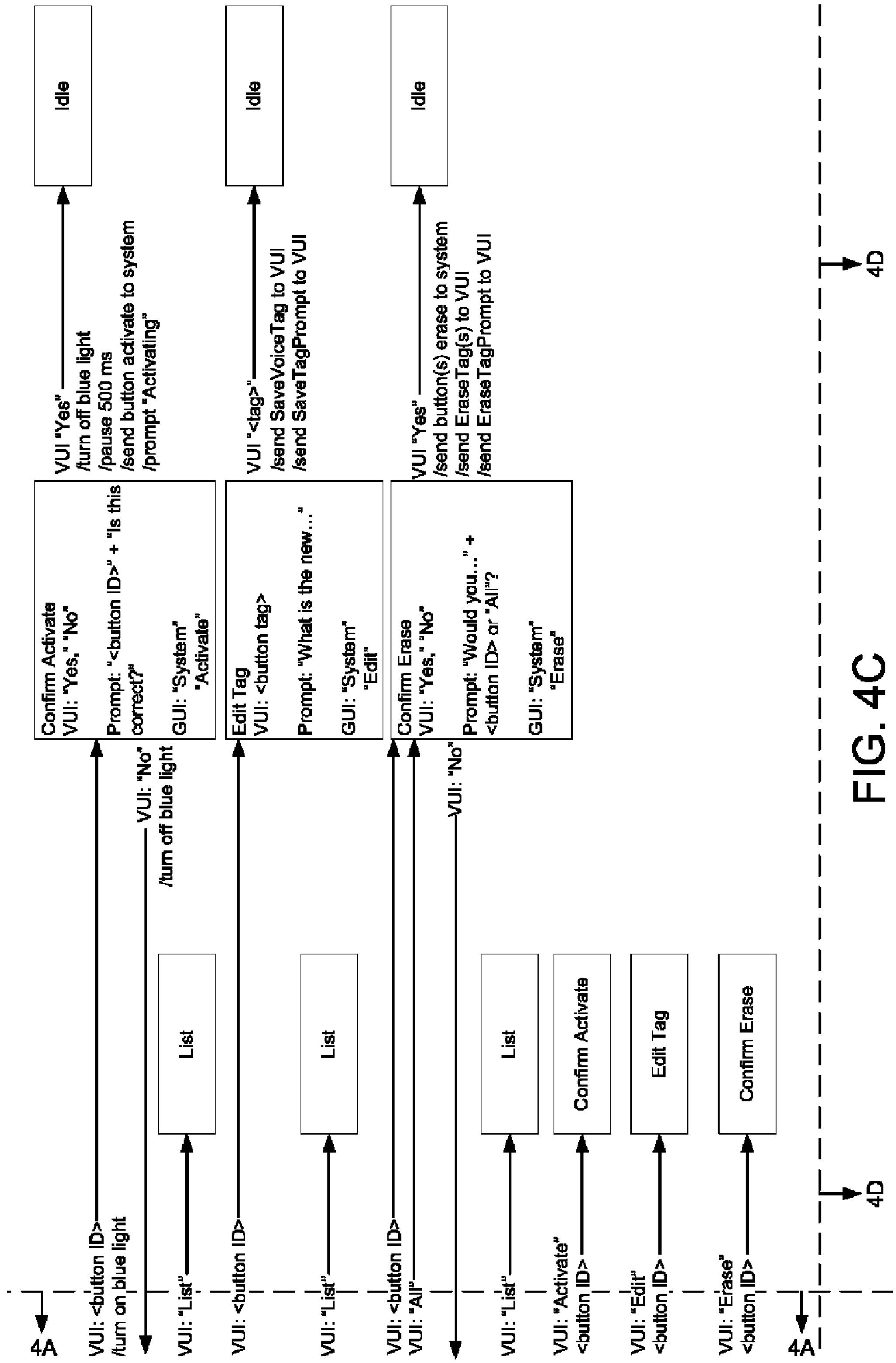
Figure 4D:
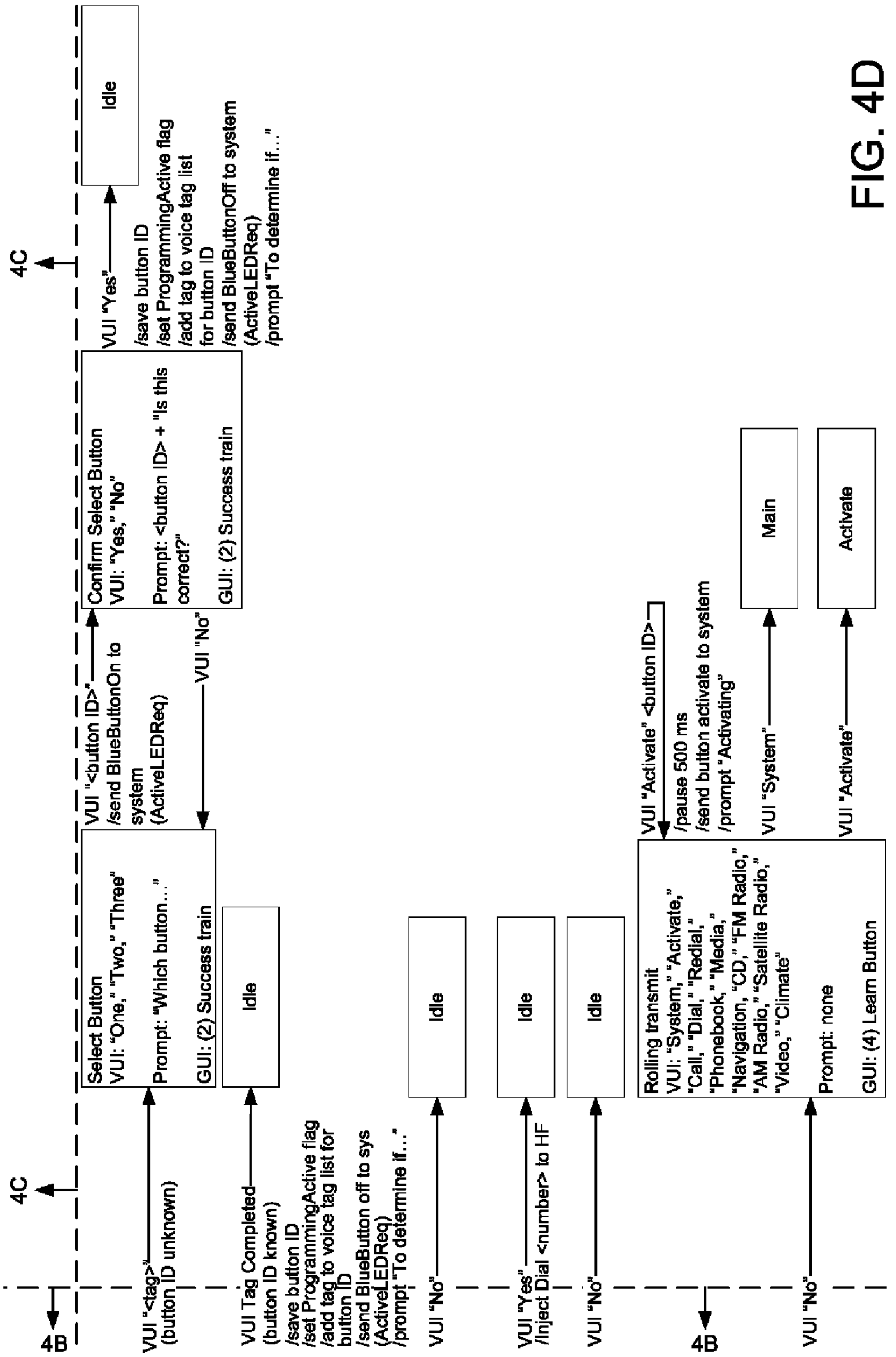

Referring to FIGS. 2-3, the vehicle system 10 includes a WCS 30 that is generally configured to facilitate communication between the WCS and a user interface system 40 (e.g., a hands-free phone system) over a wireless network (e.g., Bluetooth, IEEE 802.11(a)/(b)/(g), etc.). The wireless network may be a short range wireless network (e.g. with a maximum communication distance less than 100 meters, less than 50 meters, less than 30 meters, less than about 20 meters, less than about 10 meters, less than about 5 meters, and/or less than about 1 meter), may use data encryption, and/or may use point-to-point connections. In an exemplary embodiment using Bluetooth technology, the wireless control system 30 generally includes a transmitter 150 to facilitate communication with the hands-free system 40, a WCS microprocessor 140 to control the transmitter 150, and/or other WCS circuitry 130 to perform a local function. In one embodiment, local functions may include e.g., sending audible information to a receiver, sending (directly or indirectly) a signal to a receiver to control a device couple to the receiver (e.g. a garage door opener (GDO) receiver to open, close or otherwise control a garage door, to a receiver coupled to a security system to arm/disarm/control/monitor the system, to a receiver coupled to a home lighting module, to a receiver coupled to a home control module, to a receiver couple to a gate opener configured to open a gate, to a receiver coupled to a computer system in order to provide an input and/or control to the computer system), to a receiver coupled to another remote vehicle system (e.g., the audio system, HVAC or vehicle entertainment system), etc.

The WCS 30 may be configured to learn signals from original transmitters (i.e. other transmitters that are configured to control a system of a receiver and exhibit characteristics representative of a signal configured to control the system of the receiver, etc.). For example, the vehicle system 10, as shown in FIG. 2, includes a WCS e.g., a trainable transceiver 50 coupled to a vehicle interior element 60 or a visor as shown. Trainable transceiver 50 includes a housing 70 that can be attached to the vehicle interior element 60 by fasteners, such as, snap fasteners, barbs, screws, bosses, etc. and includes a molded plastic body having three push button switches disposed therein. The trainable transceiver 50 further includes switches 80, 90 and 100 covered by back-lit icons. The illustrated embodiment includes a logo 110 on the housing 70 and a display element 120 disposed therewith. During operation and/or training, display element 120 is selectively lit.

In operation, trainable transceiver 50 is configured to receive one or more characteristics of an activation signal sent from another transmitter (not shown). For example, the trainable transceiver 50 may be configured to act as a controller for other electronic systems. The electronic system may control a residential system (e.g., a garage door opener, security system, lighting module, home control module, gate opener and/or a computer system). An example of a trainable transceiver is a Homelink trainable transceiver, manufactured by Johnson Controls Interiors LLC, Holland, Mich. and may be constructed according to one or more embodiments disclosed in U.S. Pat. Nos. 6,091,343, 5,854,593 or 5,708,415, which are herein incorporated by reference in their entirety.

As will be appreciated, other implementations of the various exemplary embodiments could be made in connection with a home and/or vehicle. For example, in yet another implementation vehicle system 10 includes a proprietary speech recording/playback system that enables a driver or other vehicle occupant to speak directly/indirectly into a microphone to record any notes or other information which the user would otherwise write down on paper, but which cannot be accomplished easily while driving the vehicle 20. The notes or other information can be played back from the recording/playback system over a speaker once the user reaches his/her destination and prior to exiting the vehicle 20.

The vehicle system 10, as shown in FIG. 3, includes a (WCS) circuit 130 configured to control the various portions of system 10. Circuit 130 may include various types of circuitry, digital and/or analog, and may include a microprocessor, microcontroller, application-specific integrated circuit (ASIC), or other circuitry configured to perform various input/output, control, analysis, and other functions to be described herein. In the illustrated embodiment of FIG. 3, a WCS processing circuit 140 (e.g. a microprocessor) is included in the vehicle system 10, which is connected to a transmitter 150.

In some embodiments, the transmitter may have an extremely low power consumption relative to the device with which they are integrated. Accordingly, the transmitter 150 can be maintained in an "on" state even when the vehicle 20 is turned off Transmitter 150 is configured to transmit data in response to a signal from processor 140. Transmitter 150 is configured to be in communication with a receiver 160. The transmitter 150 and receiver 160 include antennas 170, 180 (respectively) for enabling communication between the transmitter 150 and receiver 160. In one embodiment, the transmitter 150 is a transceiver and includes a second antenna (not shown) for enabling two way communications with a second receiver (also not shown). Receiver 160 accepts the data from the transmitter 150 and may be remotely located with respect to the transmitter 150. In the shown exemplary embodiment of FIG. 3, the receiver 160 is connected to a user interface system 40. The user interface system 40 includes a hands free processor 190 but may include any number of electronic devices including but not limited to a notebook computer, a hand-held PDA, a cellular phone, a pager, or any other electronic component.

In the exemplary embodiment shown in FIG. 3, the user interface system 40 includes an audio circuit (or system) 200 and a display 210. The audio circuit 200 may be connected to its own independent speaker system or it may be configured to connect to the vehicle's audio system. Display 210 may be mounted in a hand-held device, dashboard or instrument panel, an overhead console, a floor mounted console, a visor, a rear view mirror or at a wide variety of other locations inside the vehicle 20. Display 210 may comprise a small cathode ray tube ("CRT"), a liquid crystal display ("LCD") or various other forms of displays which are easily visible in daytime as well as nighttime driving conditions. Alternatively, the user interface system 40 may not include a visual display.

When the user interface system 40 comes into the vicinity of the vehicle 20, a high speed, automatic, wireless data link may be created between the transmitter and receiver. The required proximity will vary depending upon the power output of either transmitter/receiver. For example, on a 0 dBm (1 mW) power output, a transmission range of up to about 10 meters is provided. Providing a suitable external amplifier to increase the output power of the transmitter and/or receiver to a maximum of 20 dBm will increase the transmission range up to about 100 meters. It will be appreciated, however, that with even greater power amplifiers an even greater transmission range can be expected. Some standards have identified a 20 dBm maximum power output. In some embodiments, the transmitter 150 and receiver 160 may be continuously connected, in some embodiments transmitter 150 and 160 will be configured to automatically make a connection when a vehicle power setting is turned on (e.g. accessory on, engine on, etc.), in some embodiments transmitter 150 and receiver 160 will only make a connection when data is to be transferred, etc.

Thus, the user is not required to type in or otherwise give any commands to the user interface system 40 before the wireless communications link is established. Once established, the communications link enables data representative of audible information from the WCS circuit 130 to be automatically transmitted.

Once the wireless communications link is established between the transmitter 150 and receiver 160, data can be transmitted to the receiver 160 and audible information can be output to the vehicle's audio system or circuit 200 and/or visual information can be displayed on the display 210 in response to the data. Or the vehicle system 10 may not include a display.

WCS may send data related to audible information in any number of manners. In some embodiments, WCS 30 stores audible information that can be output from a memory associated with the WCS and is configured to send the audible information (e.g. prompts) to the system 40 (e.g. send data that encodes the audible information—e.g. an mp3 or way file to the system 40, send analog signals to the system 40, etc.) to be output by system 40. In some embodiments, WCS 30 stores (in a memory associated with the WCS, as part of a code for a program executed by processor 140, etc.) data corresponding to audible information provided in system 40 and is configured to transmit data to system 40 (based on the stored data) such that system 40 will output the audible information stored by system 40 in response to the data received from the WCS.

In some embodiments, a user may use system 40 to control WCS 30. In some embodiments, a user enters a voice command by having a user press a button. The button press causes the user interface system 40 (e.g., a hands-free system) to identify and interpret a voice command from a user. In some embodiments, the hands-free system identifies voice commands without using a button press. Other types of actuators/switches may be utilized e.g., knobs, dials, etc., or more advanced input devices, such as biometric devices including fingerprint or eye scan devices. In another embodiment, a voice-actuated input control circuit is included in the vehicle system 10 and configured to receive voice signals from a user and to provide data relating to the signals (e.g. the signals, data based on the signals, etc.) to the WCS control circuit 130. The user system 40 may include a voice user interface, graphical user interface and/or a multi-modal interface. The multi-modal interface can include soft keys and be configured to control several other devices in addition to the vehicle system 10.

The vehicle system 10 may be used to initiate voice-aided training Initiating voice-aided training may include transferring commands to the user interface system 40 to play prompts stored or transferred to the user interface system. Initiating voice-aided training may include transferring voice prompts stored/transmitted to the WCS. The wireless communication system may use a number of voice prompts, including but not limited to one or more of the voice prompts shown FIGS. 4A-5C. The wireless communication system may use a logic that includes one or more of the steps shown in the figures.

Transmitter 150 may also be configured to send data to control a wireless system. In one embodiment the transmitter 150 is configured to generate a carrier frequency at any of a number of frequencies in the ultra-high frequency range, for example between 260 and 470 megaHertz (MHz), wherein the control data modulated on to the carrier frequency signal may be frequency shift key (FSK) or amplitude shift key (ASK) modulated, or may use another modulation technique. The data on the wireless control signal may be a fixed code or a rolling code or other cryptographically encoded control code suitable for playback on a remote electronic system. In other embodiments, these functions may be carried out by a separate transmitter which may be distinct from transmitter 150, and/or which transmitter may be connected to processor 140 and/or circuit 130.

In other embodiments, data may be transferred between WCS 30 and system 40 using a wired connection. For example, WCS 30 may be directly wired to system 40. As another example, data may be transferred between WCS 30 and system 40 over a data bus such as a vehicle's data bus.

In some embodiments, data may be transferred indirectly between WCS 30 and system 40. For example, data may be transferred (wireless or wired) to one or more intermediate systems which transfer data between WCS 30 and system 40. If intermediate systems are used, the intermediate system may simply be a pass-through conduit for data transfer, or one or more intermediate systems may process the data transferred to or from WCS 30 and/or system 40.

In some embodiments, WCS 30 may cause audible information to be provided without the use of system 40. For example, WCS 30 may include a speaker configured to output audible information in response to signals from processor 140. As another example, WCS 30 may be directly connected to a vehicle audio system such that WCS 30 directly controls (at least in part) output of audible information as discussed above by the audio system.

Referring to FIGS. 4A-5C, the vehicle system 10 may be configured to prompt a user (i.e. via the display or audio circuit) during a vehicle system training process (e.g. to aid in training the vehicle system 10 to control a remote system, such as to aid in programming the vehicle system based on a signal from an original transmitter (not shown), to set up communication between the vehicle system and hands-free system, etc.), to introduce the user to a vehicle system (e.g. the WCS, the hands-free system, etc.). During training of the vehicle system 10, the vehicle system 10 sends a signal over the wireless network (e.g. Bluetooth network) to activate voice prompts (see list in FIGS. 5A-C) that may be stored. The user interface system 40 is connected to the audio circuit 200 (e.g. a vehicle audio system, a home speaker system, etc.) that plays the voice prompt (e.g. instruction, status information, etc.). The user interface system 40 may also display the information (e.g. instruction, status information, etc.) on display 210 connected to the hands-free processor 190.

FIGS. 4A-D are sections of a state diagram of an application running several user devices including vehicle system 10. The vehicle includes a voice user interface (or "VUI") as well as a graphical user interface (or "GUI"). The user may enter commands and/or receive instructions through either interface. As shown in FIGS. 4A-D a user may issue voice commands to the vehicle system to operate the vehicle system and/or other user devices. For example, at a main menu 220 a user may instruct any other user device to perform several functions (e.g., a cellular phone may be instructed to "Call", "Dial", "Redial", pull up a "Phonebook"; commands may be communicated to the entertainment center such as powering on the "Media", "CD", "FM radio", "AM radio", "Satellite Radio" or "Video"; likewise other vehicle systems may be voice controlled e.g., "Navigation" and/or "Climate" as shown in FIGS. 4A-D). In one embodiment, upon command the vehicle system 10 may interface with another vehicle system and/or the user interface to execute the voice commands. For example, if the user selects "Climate" the WCS may interface with the vehicle's heating, ventilation, and cooling system (or HVAC). The user may activate other electronic systems, edit the command list, erase previous settings and/or expand lists.

The user may also program the user system through the VUI and/or GUI. For example, a user may edit a user button or command by saying "Edit" as shown at step 221. Or the user may utilize the GUI to edit/erase previous settings for user buttons as shown at step 222. Remote devices may also be programmed e.g., as shown at step 223 of FIG. 4B. Where a program signal has not been received the system 10 may re-prompt the user for the program signal. After a predetermined number of unsuccessful program attempts (however) the system may return to Idle mode (e.g., at step 224).

Various user prompts may be played to aid a user in using a system 10. For example, as shown in FIGS. 5A-C, a series of voice prompts may be configured to aid a user in programming a vehicle system 10 such as a trainable transceiver. In one example, the system starts in an "Idle" mode 230. Voice prompt 232 may be played before programming the system 10—"To begin programming the system, press and hold the button you would like to program." After the system 10 has been activated and the user may be in a main menu mode (e.g., 240 or 250). If in Main A mode 240, various prompts may be played (e.g., 242, 244 and 246). Prompt 242 may be played—"This is a wireless control system that can be programmed to operate garage door openers, gate operators and other compatible devices. To learn more visit our website at . . . ". The system shown in FIGS. 5A-C includes several modes (Idle 230, Main A 240, Main B 250, Activate A 260, Activate B 270, Programs A-H and J (280, 290, 300, 310, 320, 340, 350, 360, 370), Edits A-B 380, 390, List A-B 400, 410 as well as Erase A-B 420, 430). Various user prompts are associated with each mode. User prompts may be audibly, textually and/or graphically communicated to the system user.

Each prompt provides various information to the user regarding programming, editing, deleting and or system status information (e.g., prompts 232-238, 242-46, 252-54, 262-66, 272-76, 292-96, 302-04, 316, 322-29, 345, 352-54, 362-64, 372, 382-84, 386-88, 402-406, 412, 422-24, and 436-440). The prompts may aid the user in beginning programming e.g., 232 and 244; refer the user to other sources 234, 242 and 364; assist in resetting the system 236; alert a user to system status changes and/or the programming status of a button or channel and/or information associated with the button or channel 238, 246, 252, 272, and 324-329. Some voice prompts are dedicated to assisting the user in programming the system 10, e.g., 440 alerts the user of a programming status of the vehicle system 10. Other prompts alert a user to a result (e.g. success, failure, etc.) of a user action 276, 292, 324-329, 345, 386, 438 and 440. Some prompts let a user know which options are available 246, 254, 266, 296, 304 and 316.

Figure 6:
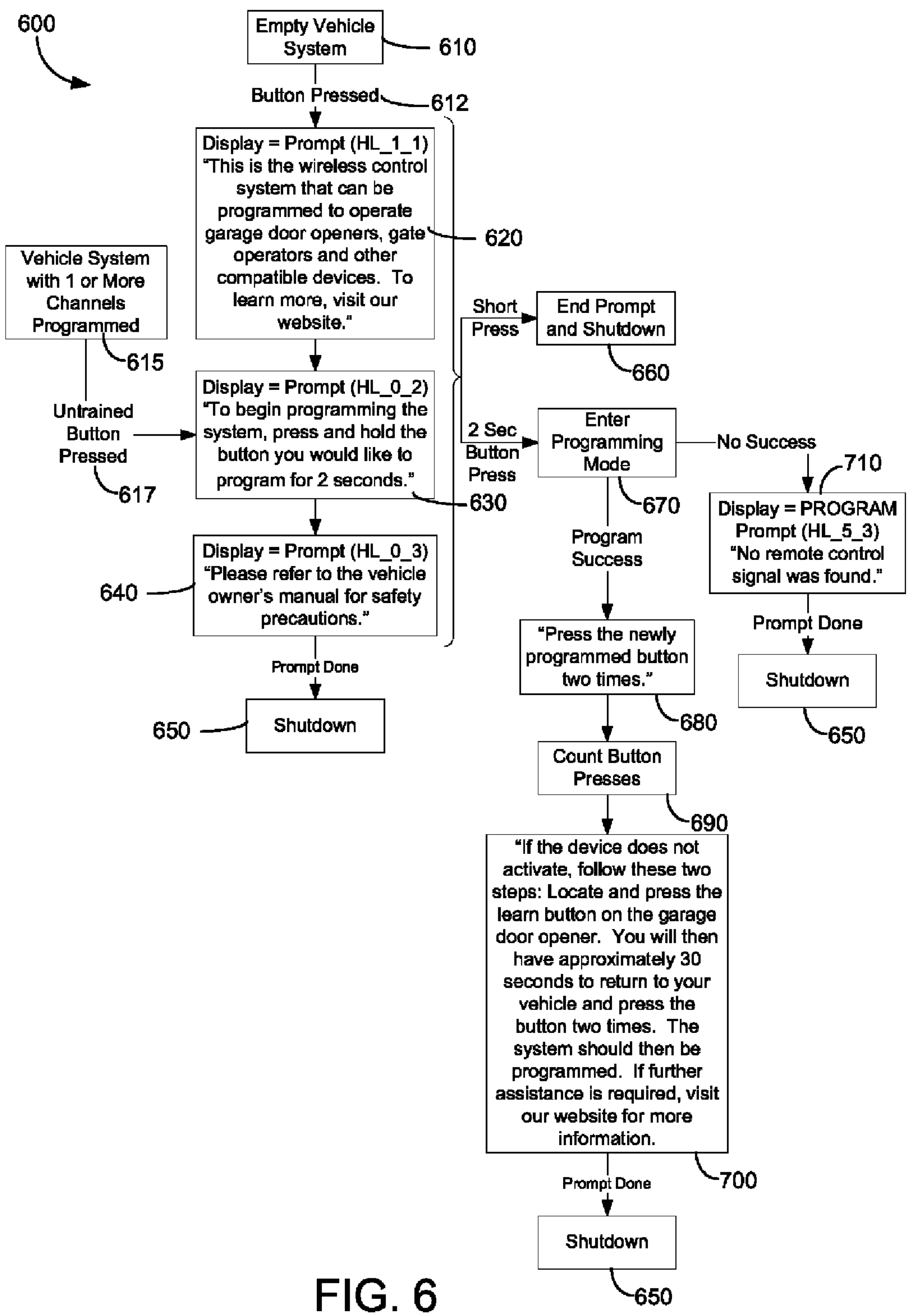
FIG. 6 is a flow diagram of a method of providing prompts for a vehicle system, according to one exemplary embodiment.

FIG. 6 shows a flow diagram 600 for providing prompts to assist in the programming of a vehicle system. If the vehicle system starts out with no buttons or channels trained in the WCS, the system starts at step 610. The button is pressed to initiate the programming sequence, the programming sequence may be configured to train the button 612 that is pressed. Upon pressing the button audio and/or visual prompts are activated. At step 620 user is provided with an audio and/or visual display on the program options for the vehicle system and/or provides information relating to the system. Following step 620, the system continues to step 630. When a vehicle system includes a trained button at step 615 but the user presses an untrained button, the system may bypass the informational audible information at step 620, and continue straight to step 630.

The user may be provided with an audio and/or visual display as shown at step 630 to aid a user in continuing and/or initiating training of the WCS. The flow diagram 600 also includes a message provided to the user at step 640 to refer to other materials. If no further user inputs are received and the prompts 620, 630, 640 have been played, the prompting may conclude, and the programming sequence may shut down (as shown at step 650). The user may also end a programming message sequence at any time by briefly pressing the empty button (as shown at step 660).

If the user presses the button for a predetermined period of time to enter into any number of alternative programming sequences; the user may then enter a program mode (as shown at step 670). If the signal is successfully detected by the transceiver the user will be prompted to press the newly programmed button for a predetermined number of times, as shown at step 680. In the illustrated embodiment of FIG. 6 (for example), the user is asked to press the button twice. The system counts the button presses at step 690 and prompts the user with further instruction at step 700. Thereafter the system may shut down (as shown at step 650). In another embodiment, any one of the buttons may be programmed to engage different functions according to the length of time in which they are depressed. Pressing a button for a relatively shorter period of time may instruct the system 10 to enter into a program mode (e.g., at step 670). Pressing the same button for a predetermined extended period of time may instruct the system 10 to shut down (e.g., at step 650) or enter into any other mode. The system may include various predetermined settings for single and multiple buttons. Though the illustrated embodiment pertains to a vehicle system 10 with voice user interface any other user interface may be used to implement the flow diagram 600.

Other devices may utilize the learn button as well. The programming logic may be changed to end introduction prompts and start the programming sequence if the button is pressed and held (or upon actuation of any other predetermined setting(s)).

If a signal is not successfully received by the transceiver (e.g. within a predefined period, the system receives an unrecognizable signal such as a noise signal, etc.), the system prompts the user indicating that such information was not received (at step 710). Thereafter the system may shut down (as shown at step 650) and/or may reenter the programming mode (e.g. a predetermined number of times) at block 670.

Figure 7:
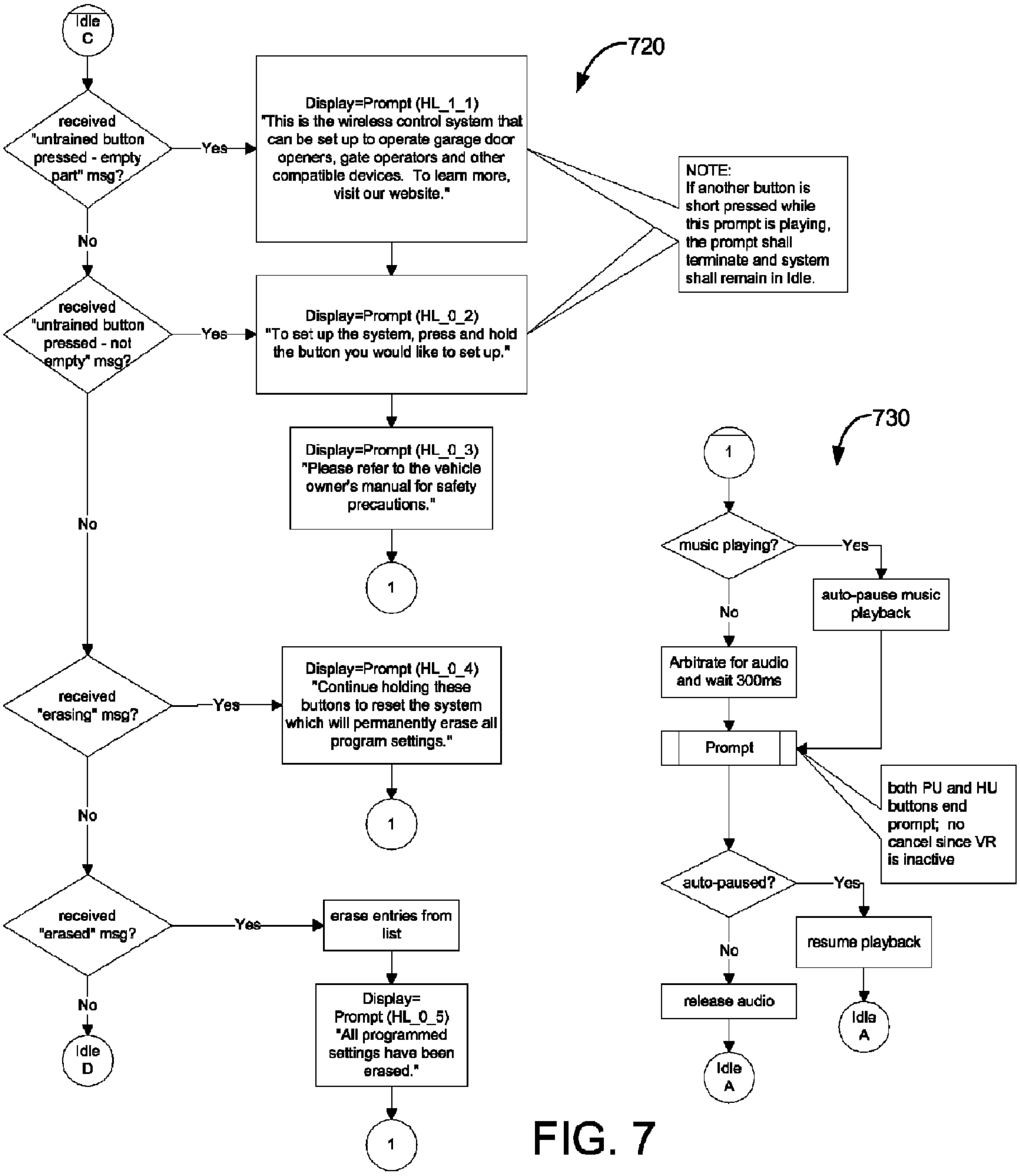
FIGS. 7-29 are flow diagrams of various methods of providing prompts for a vehicle system, according to various exemplary embodiments.
Figure 8:
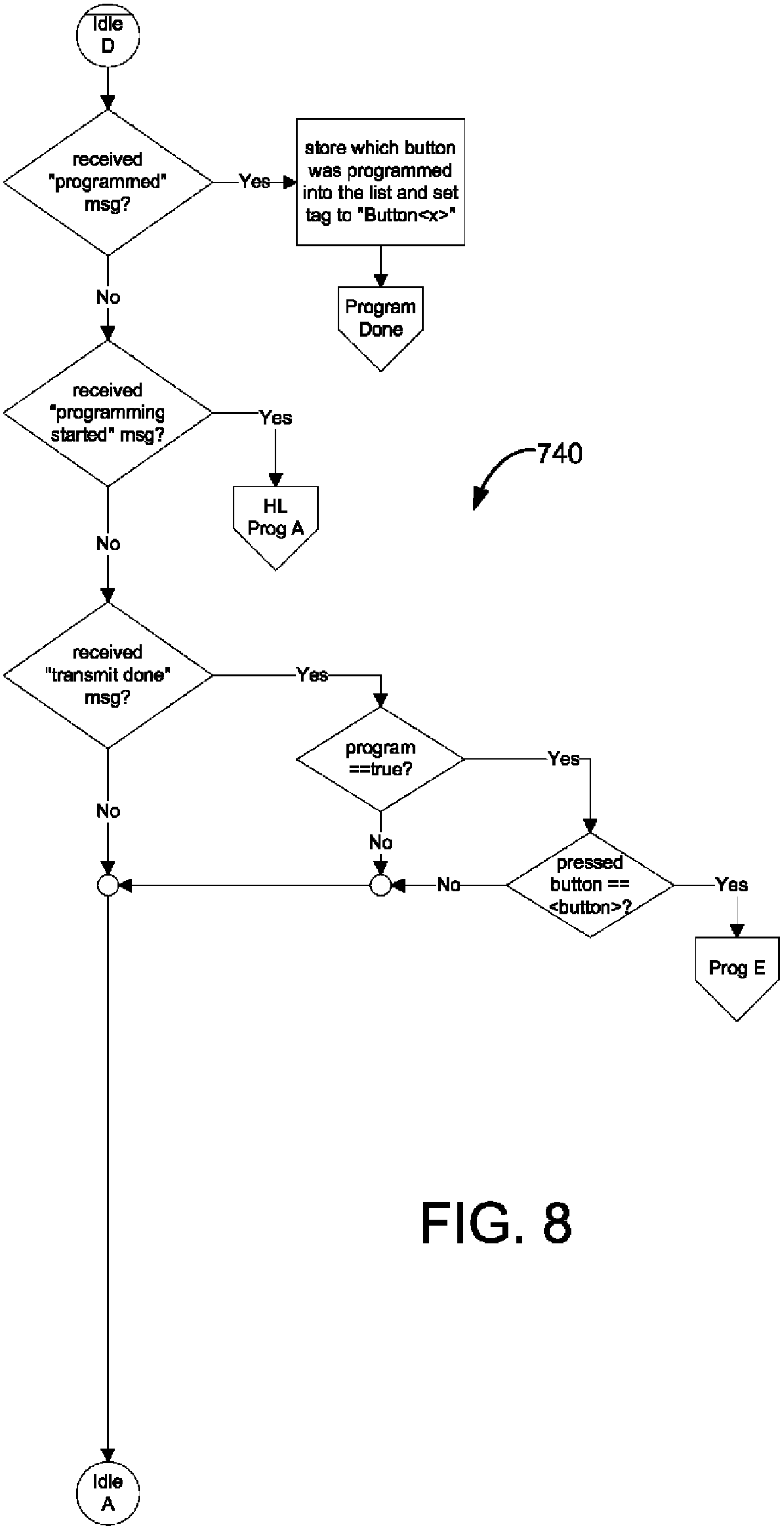

FIGS. 7-29 are flow diagrams of various methods 720-950 of providing prompts for a vehicle system, according to various exemplary embodiments. The methods shown therein are similar to the method of FIG. 6. The method 720 shown in FIG. 7 relates to programming the vehicle system 10 from idle mode. The system 10 may be programmed to interface with the vehicle audio system (e.g., as shown in method 730). Other methods may also run from idle mode (e.g. 740 as shown in FIG. 8).

Figure 9:
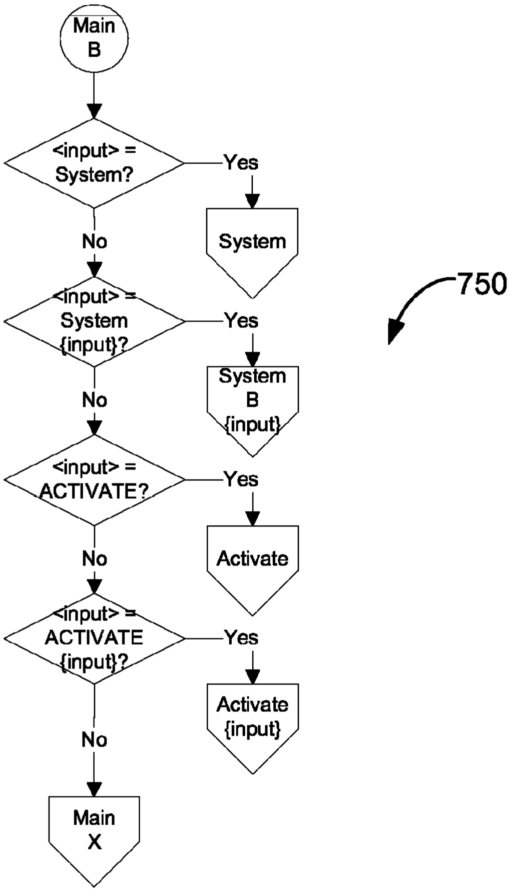
Figure 10:
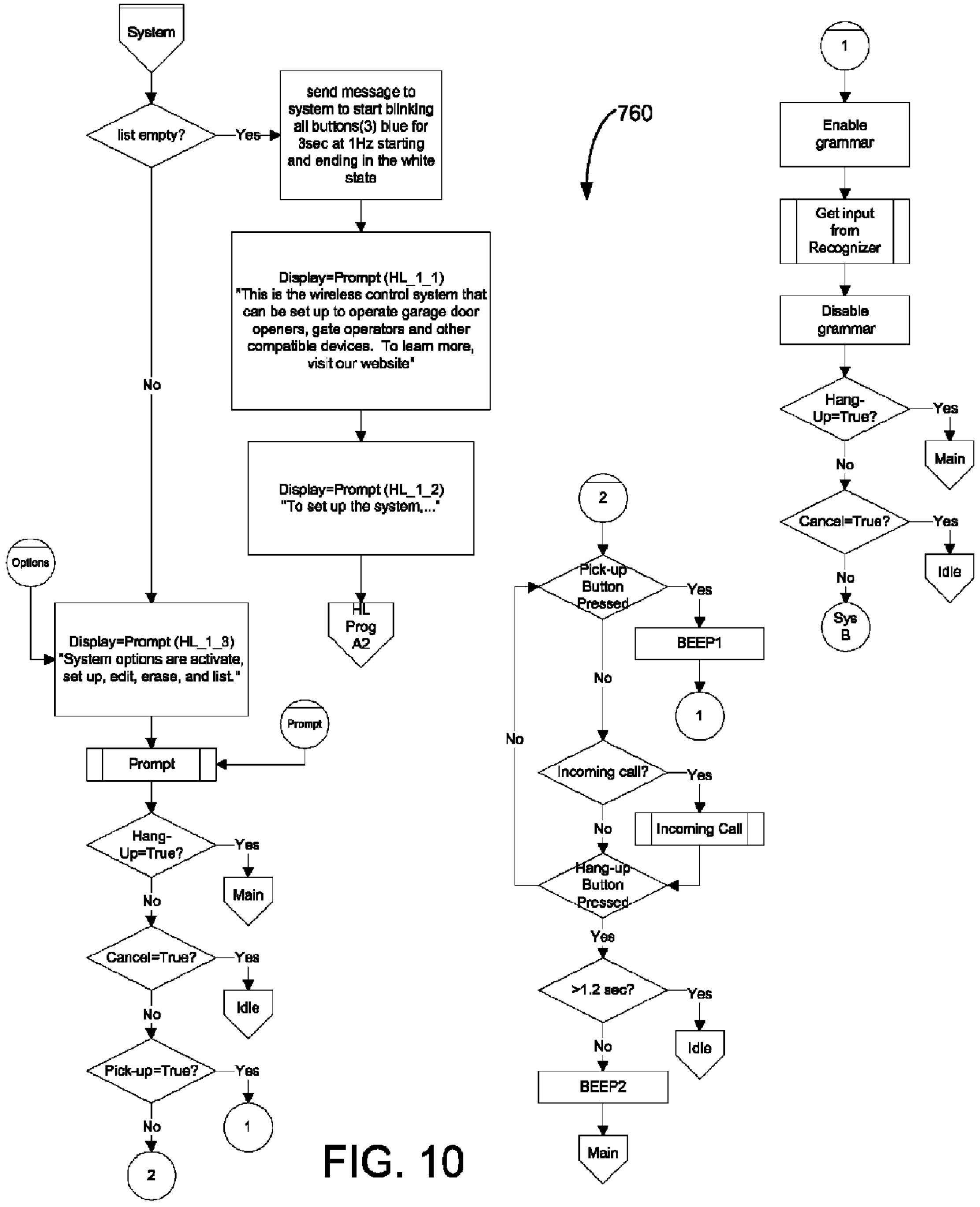
Figure 11:
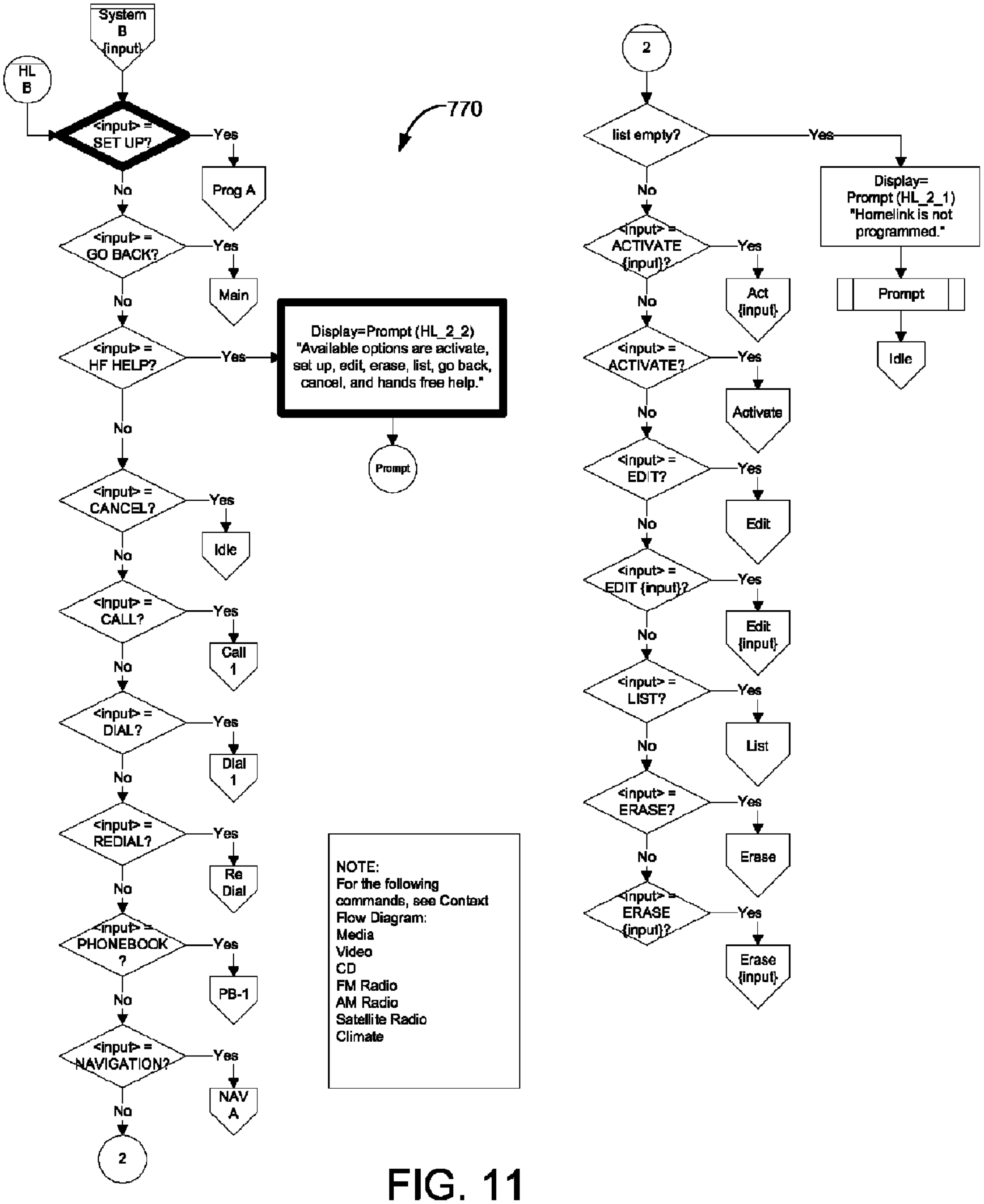
Figure 12:
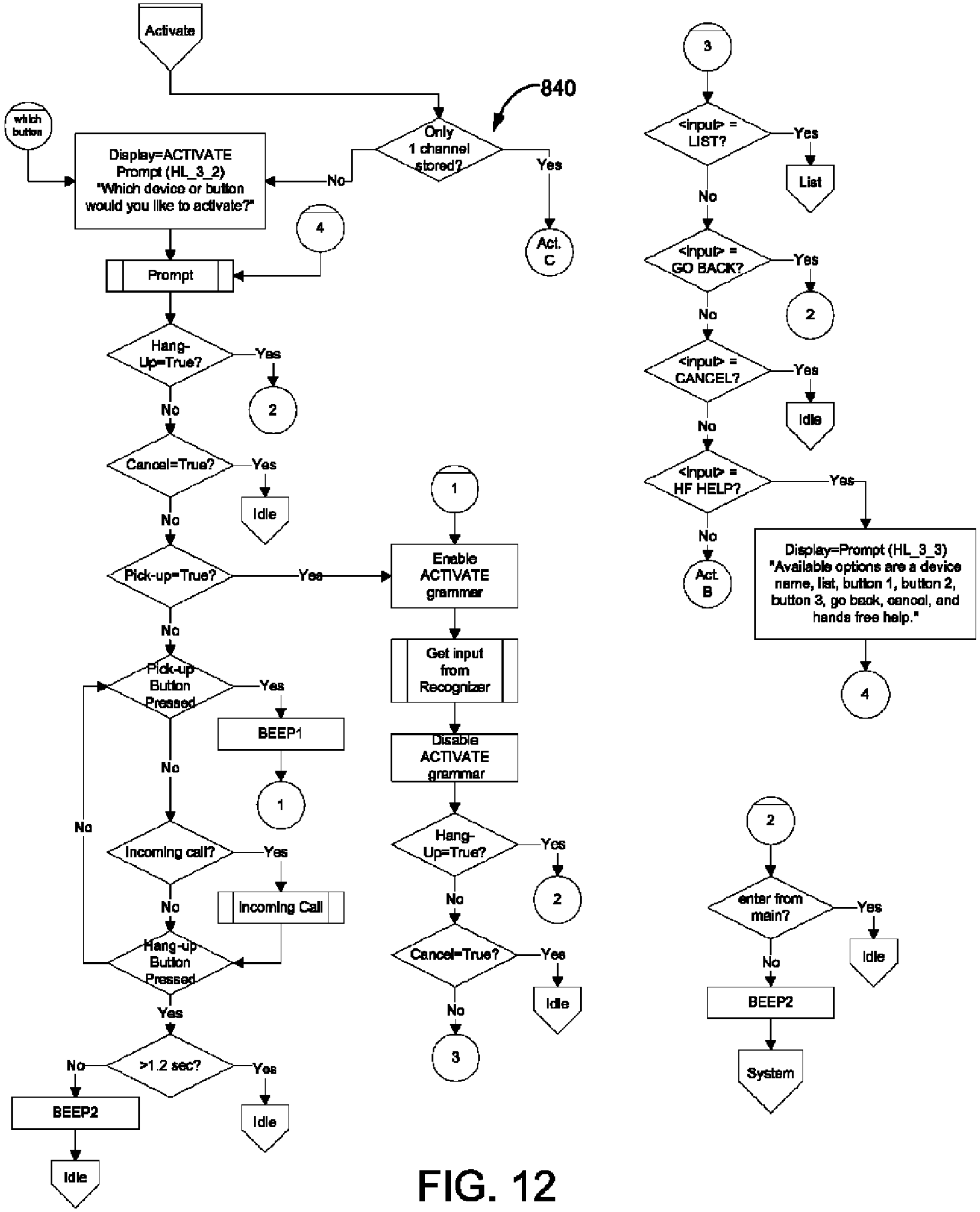
Figure 13:
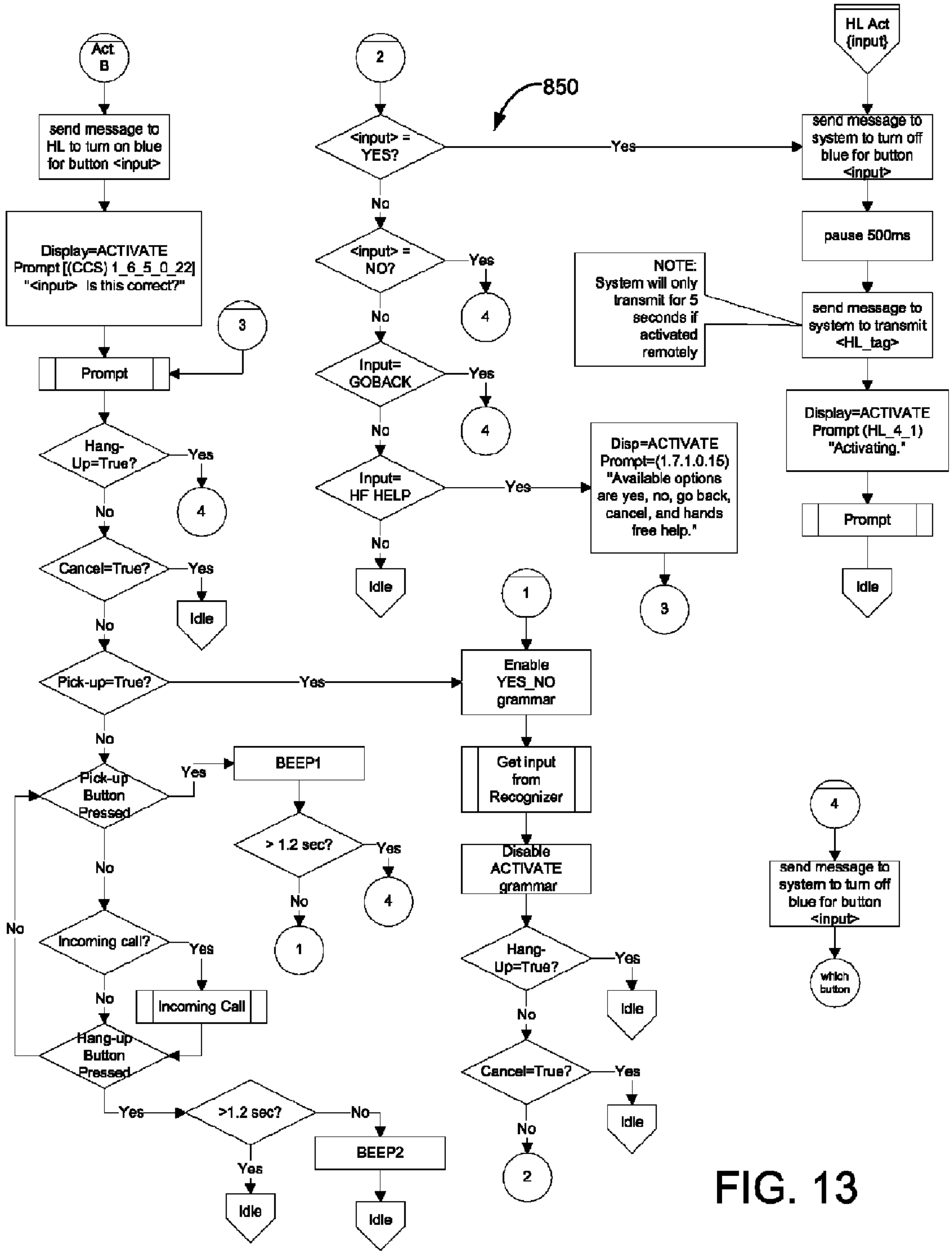
Figure 14:
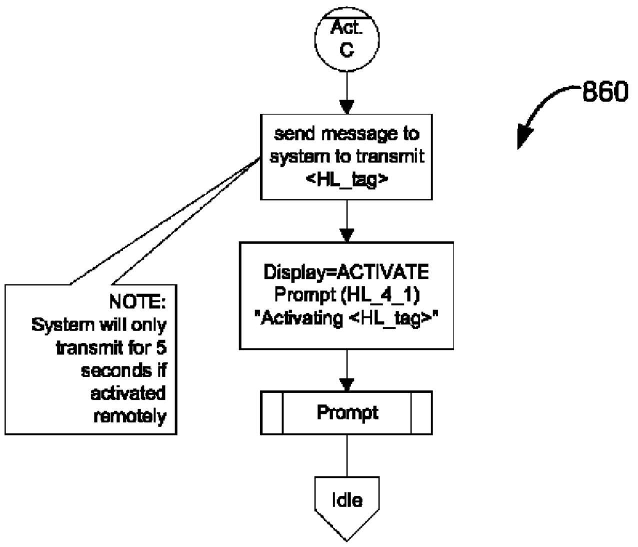
Figure 15:
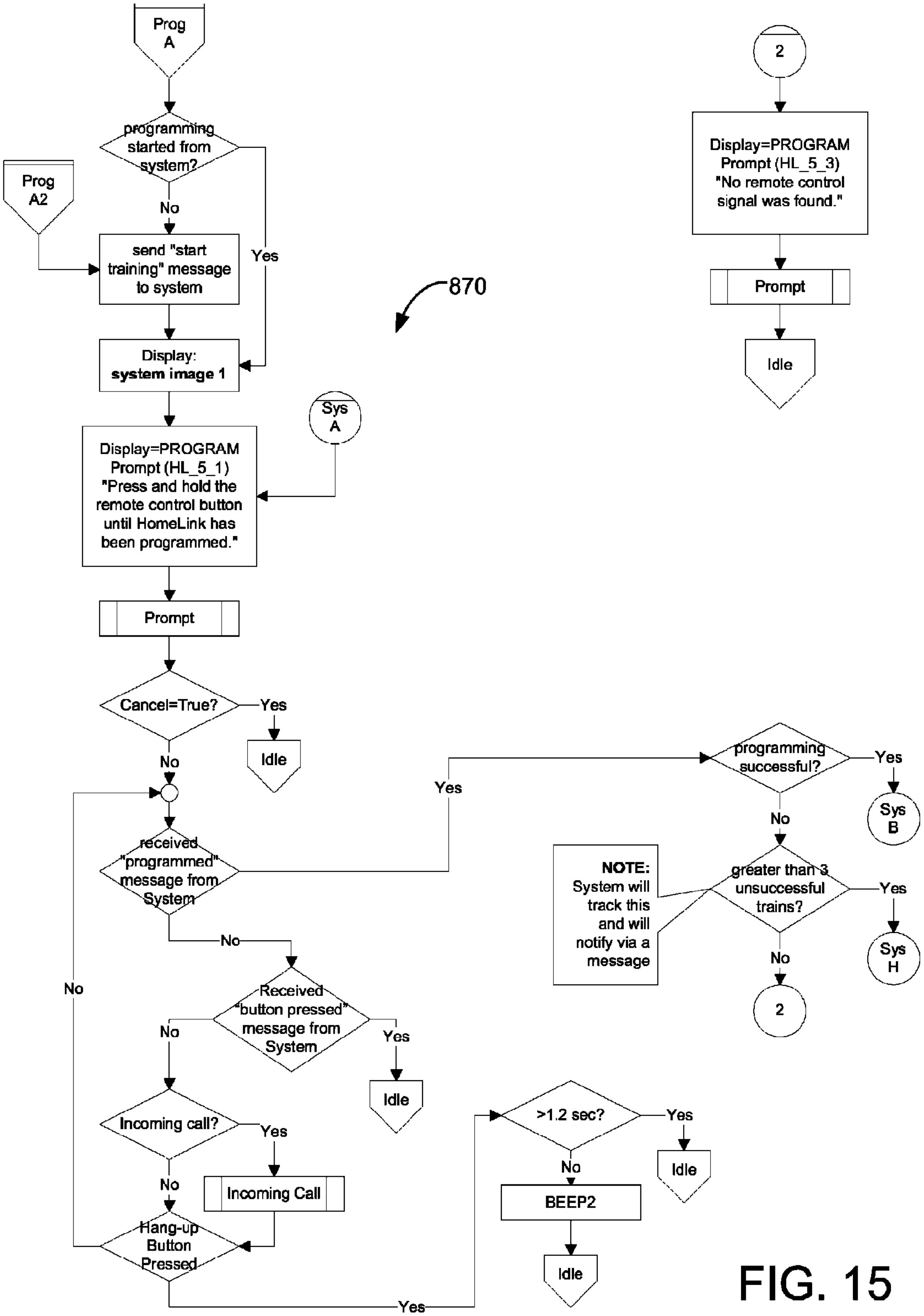
Figure 16:
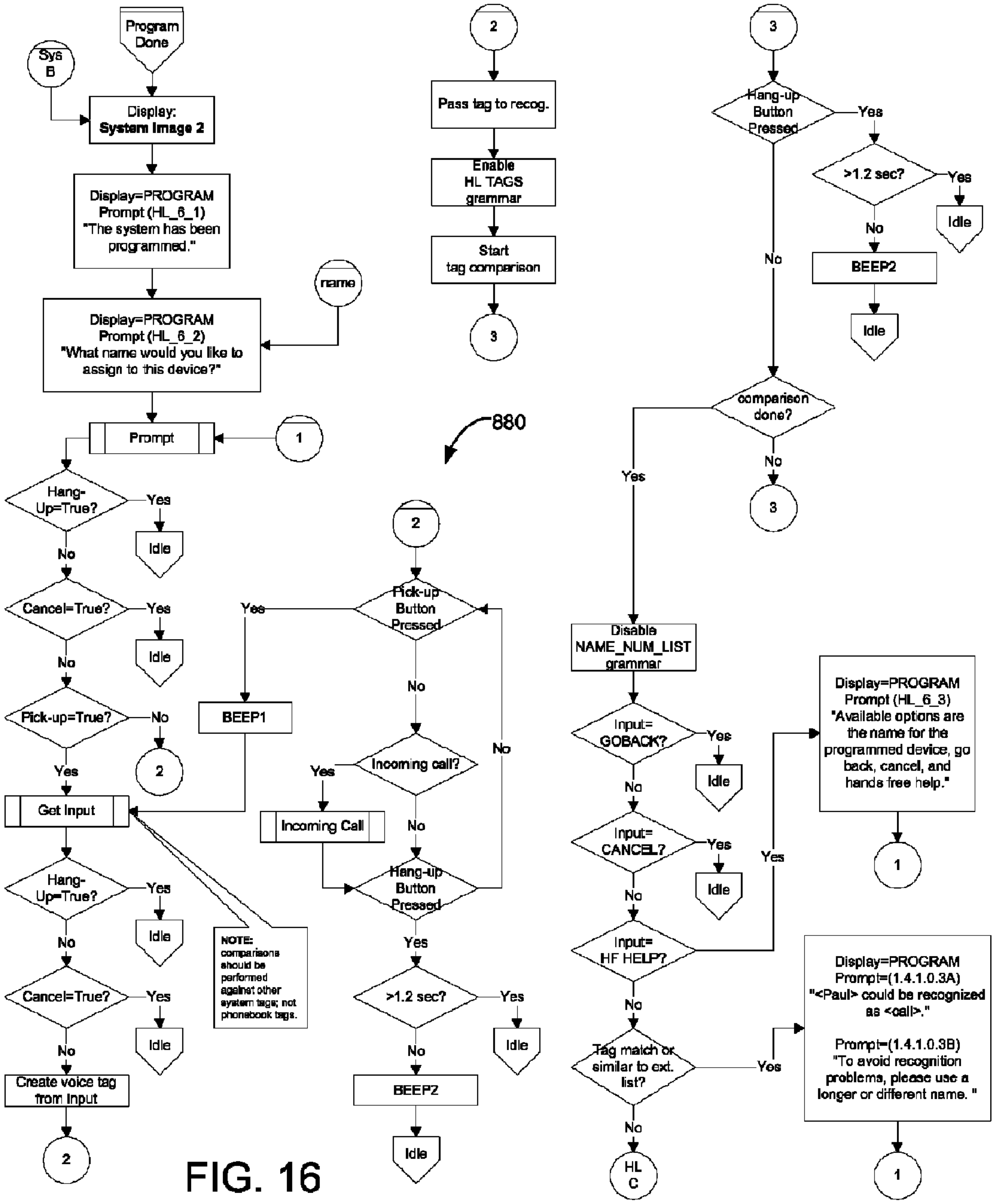
Figure 17:
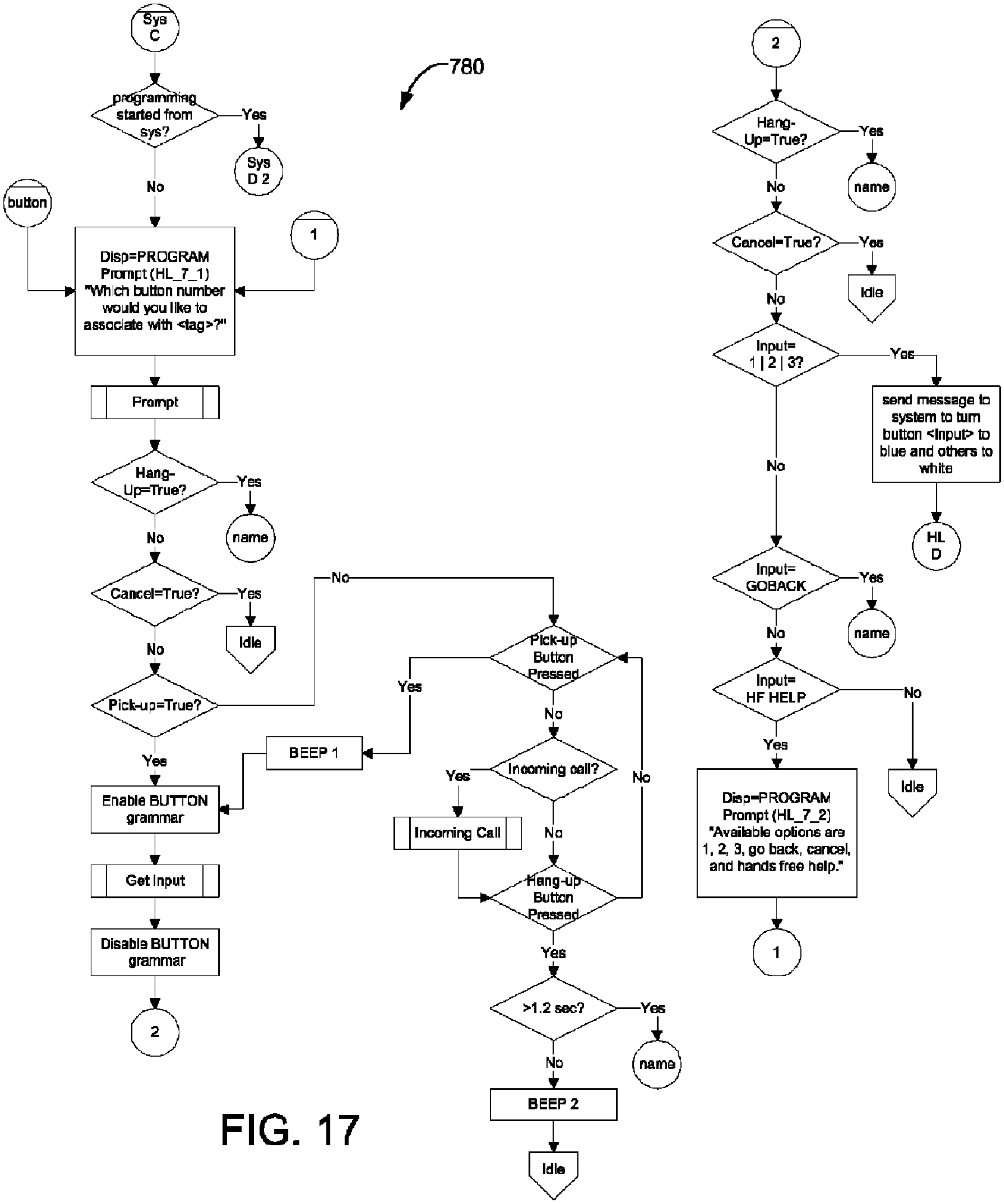
Figure 18:
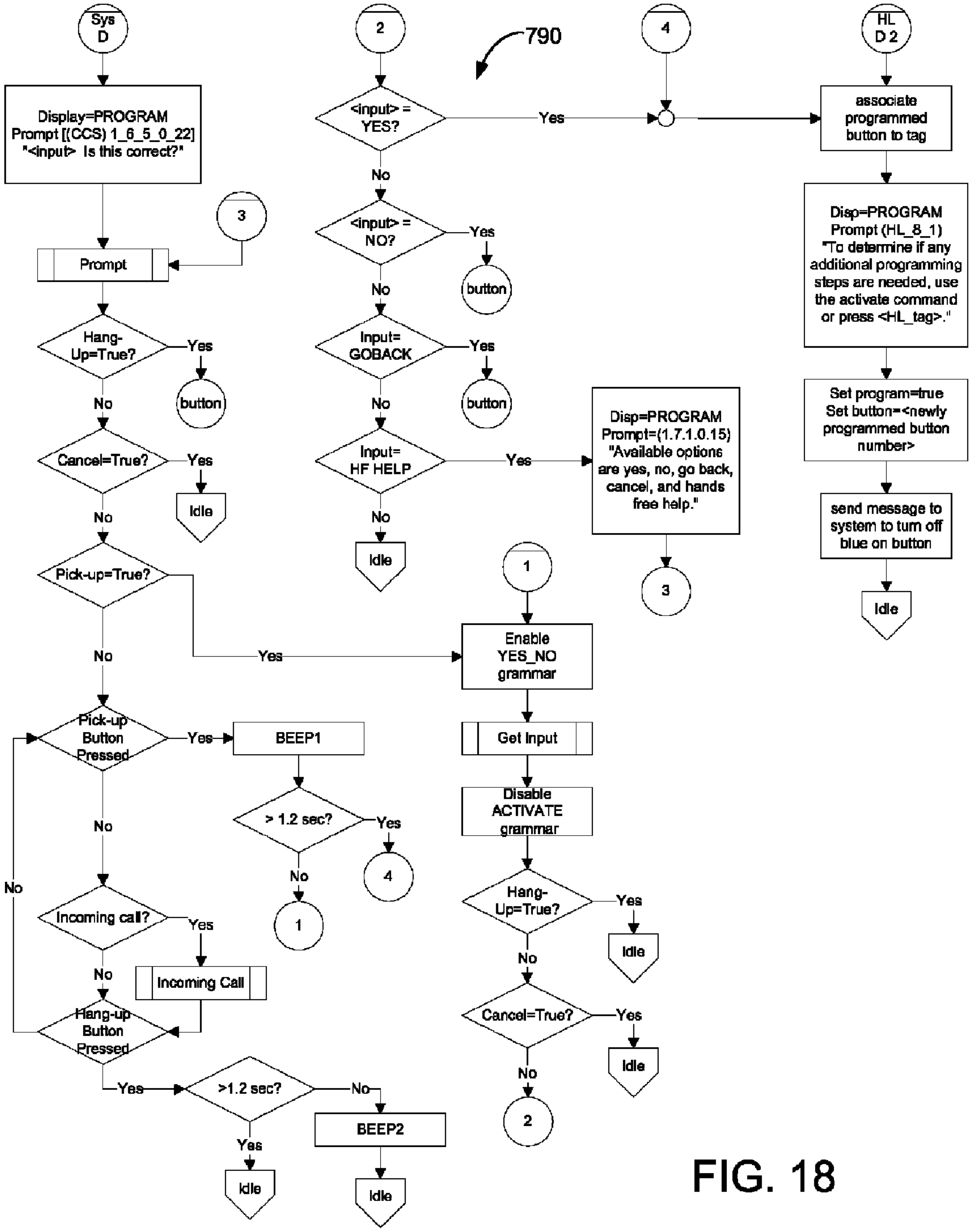
Figure 19:
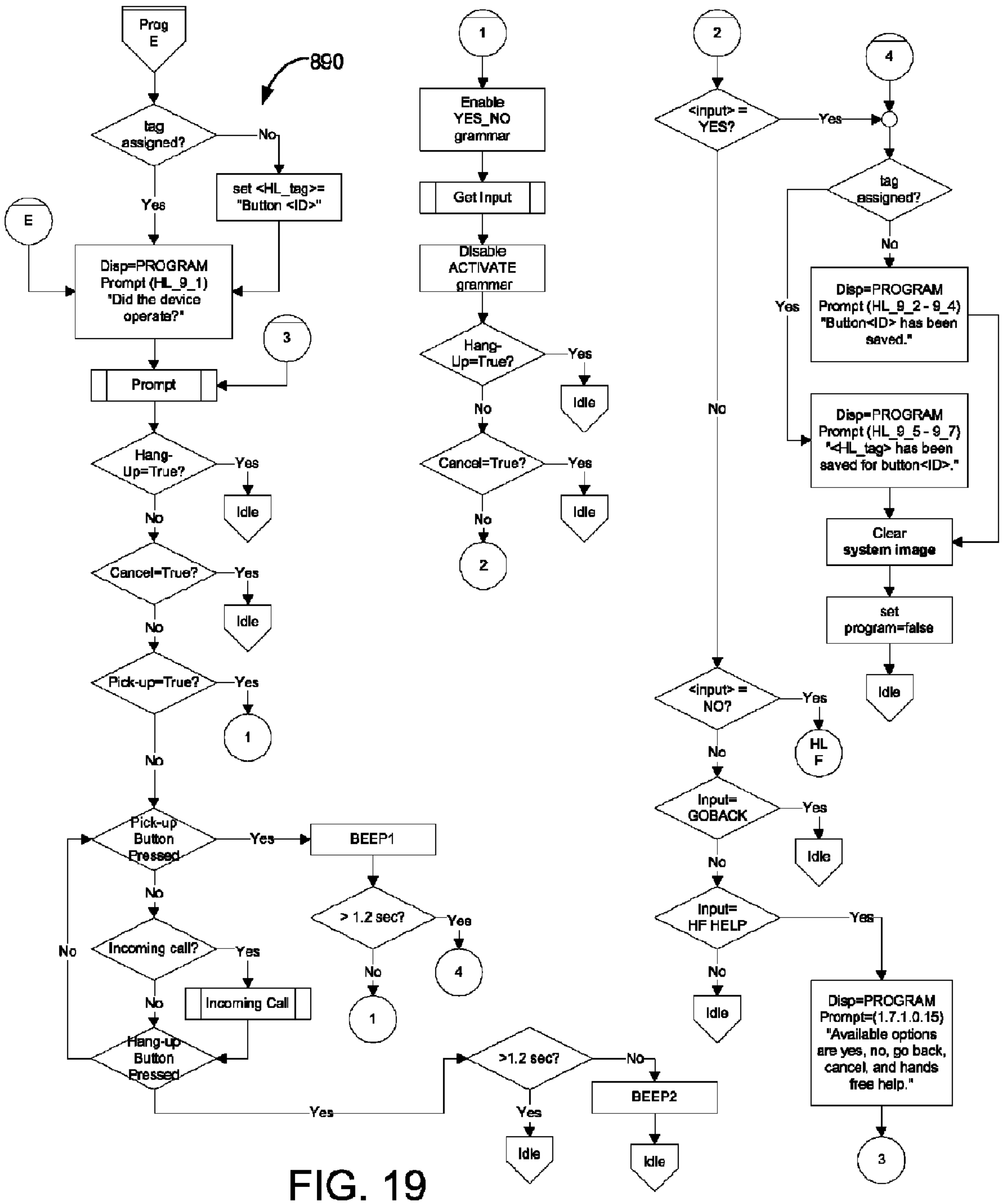
Figure 20:
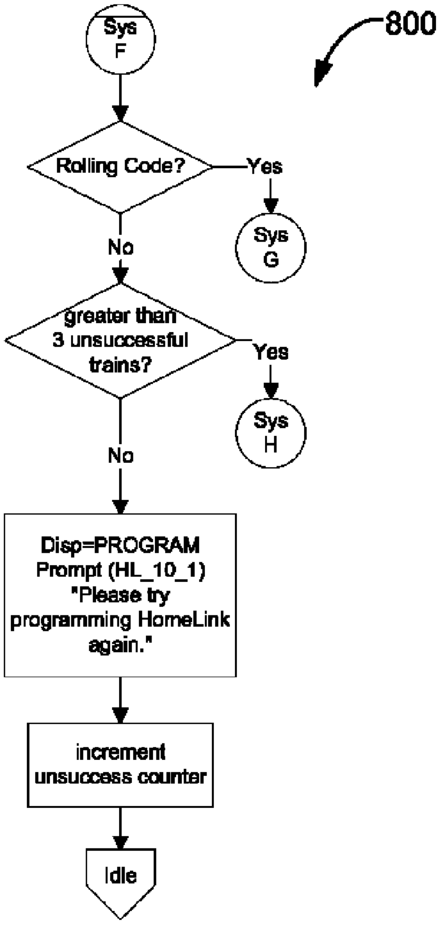
Figure 21:
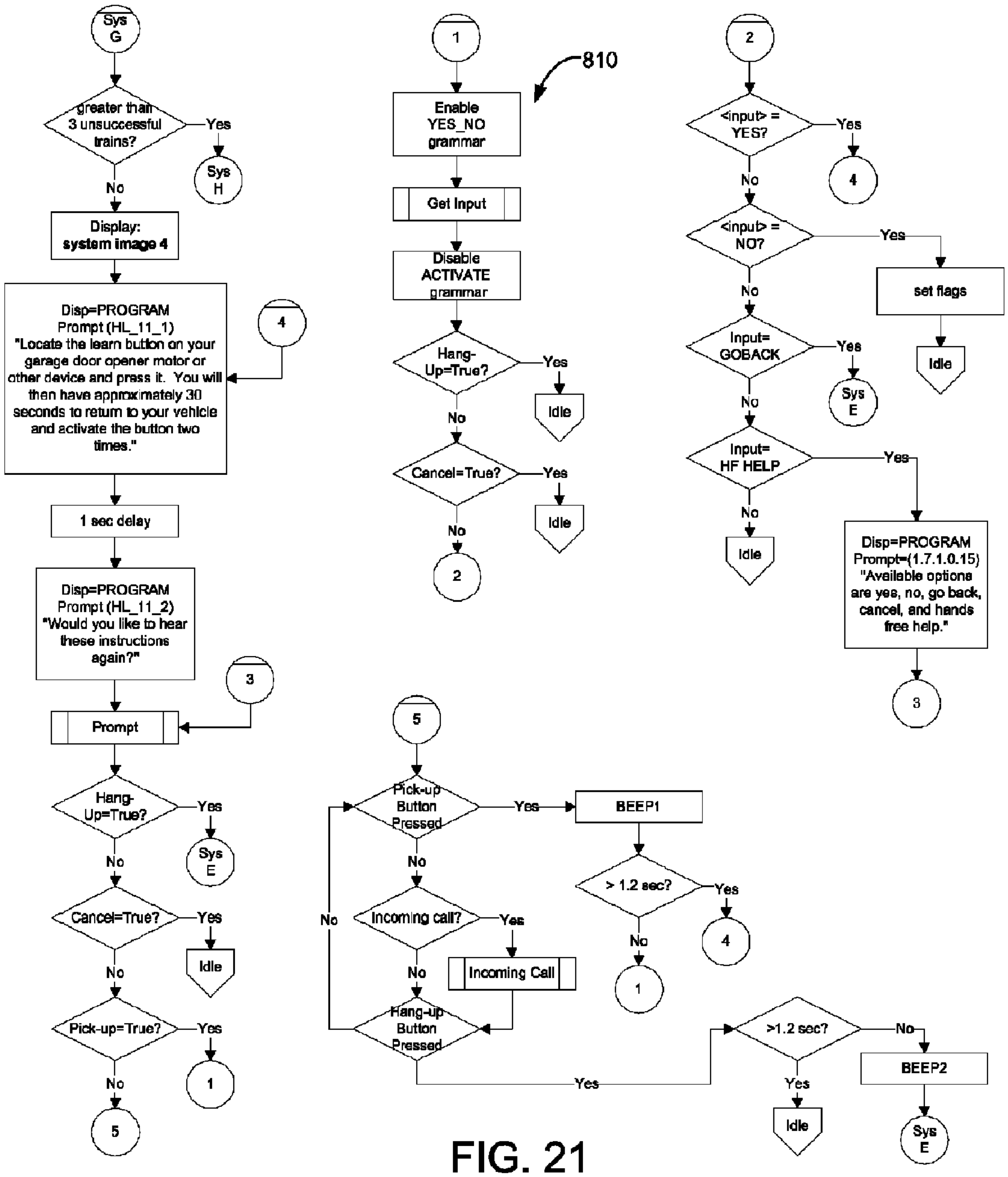
Figure 22:
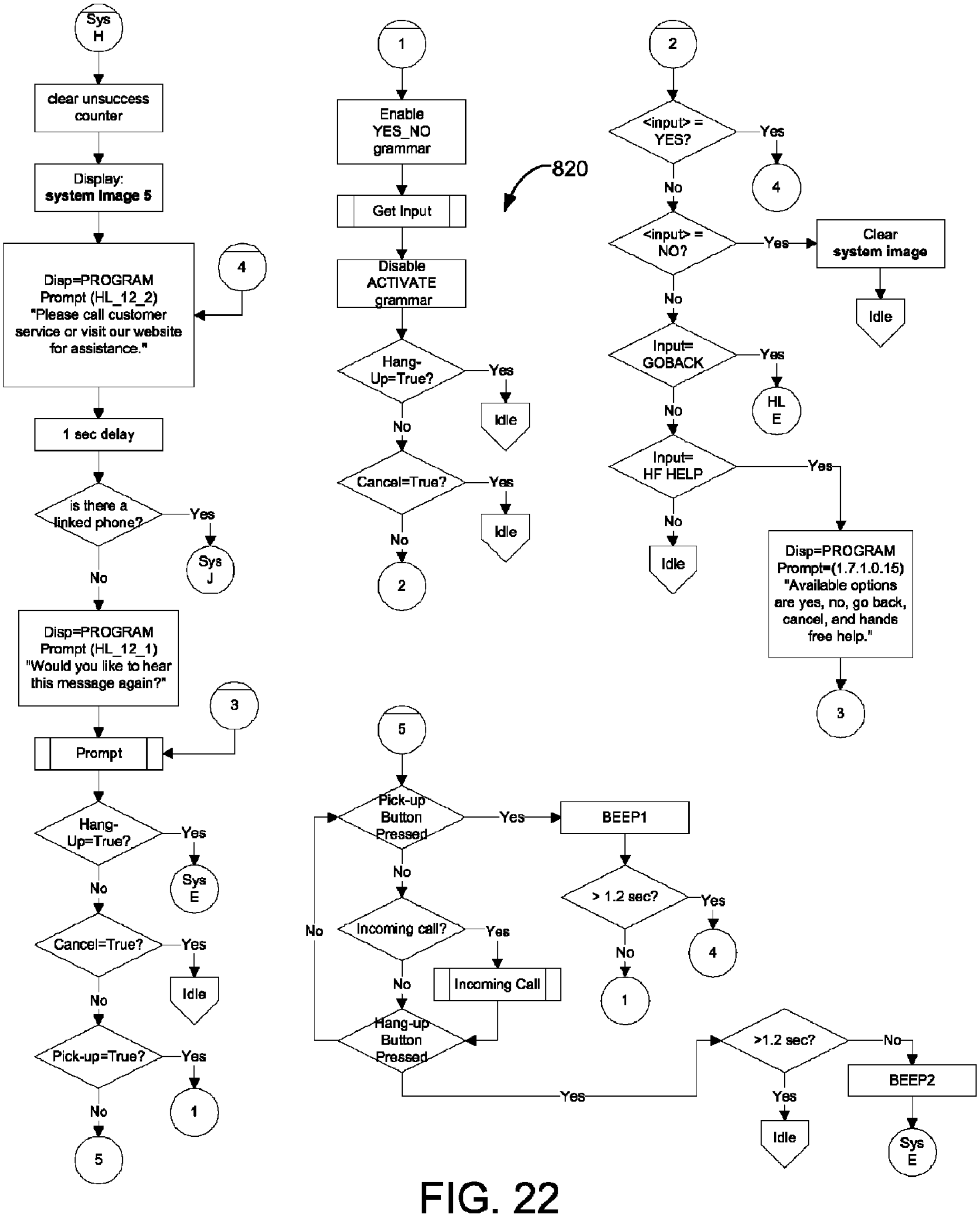
Figure 23:
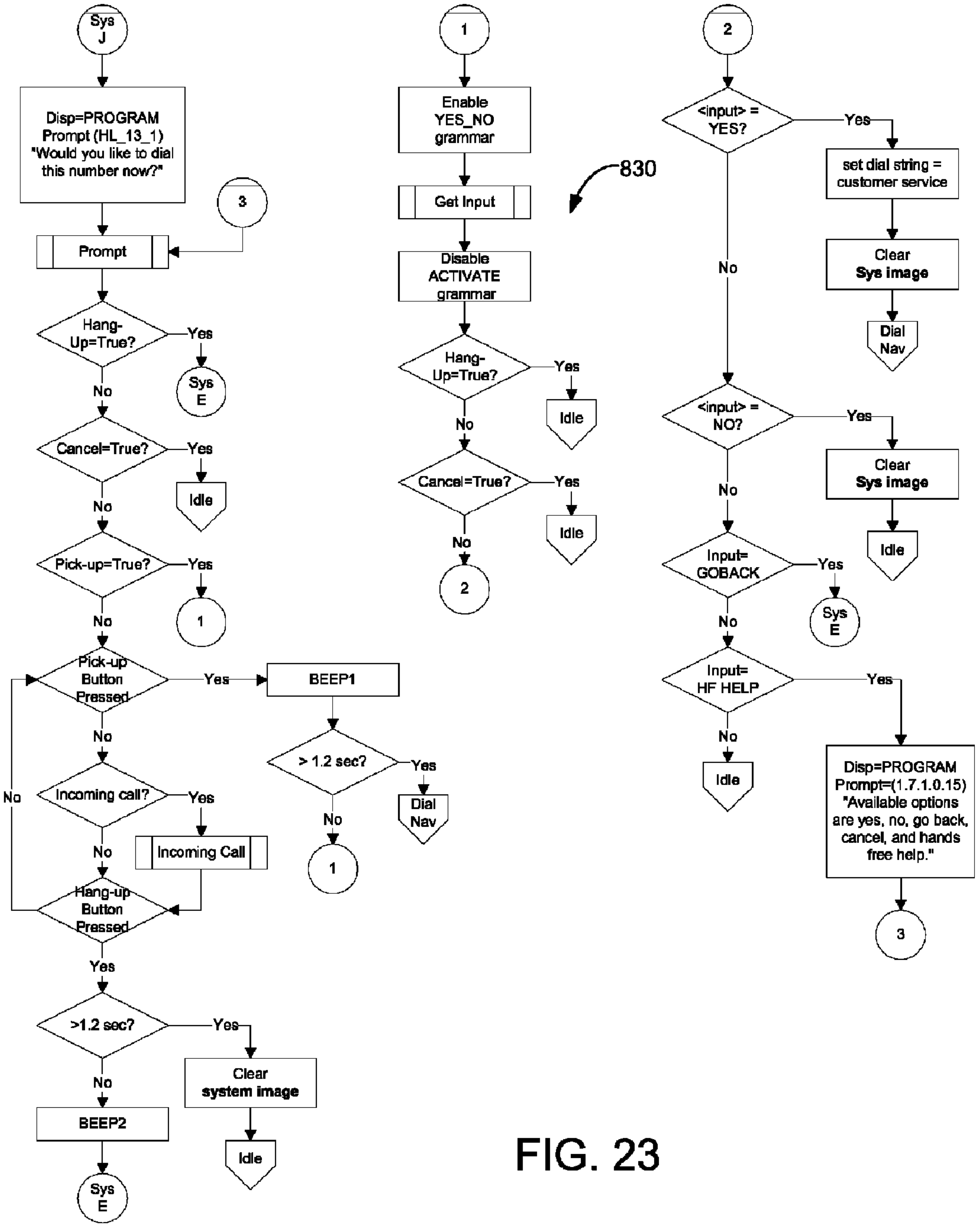
Figure 24:
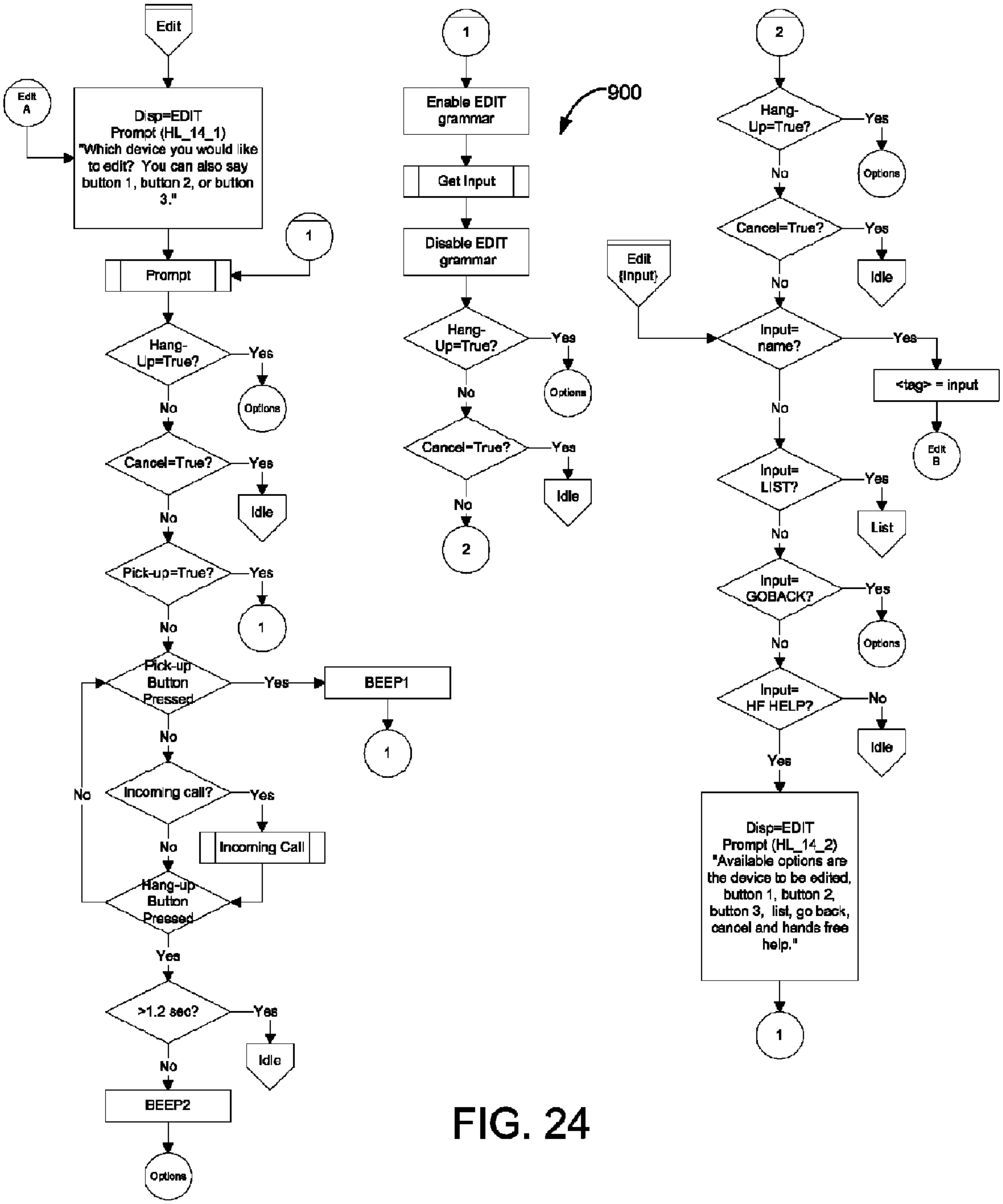
Figure 25:
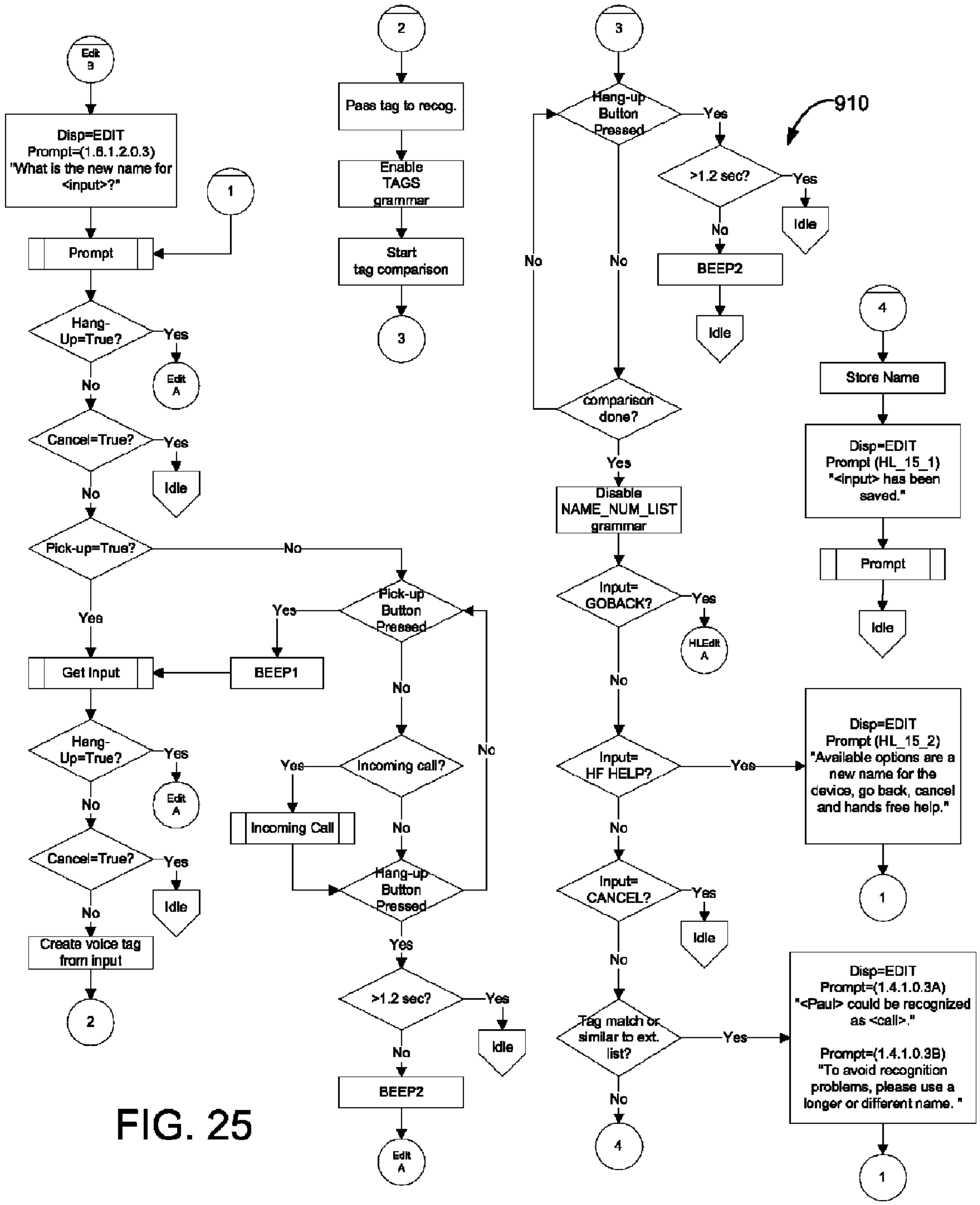
Figure 26:
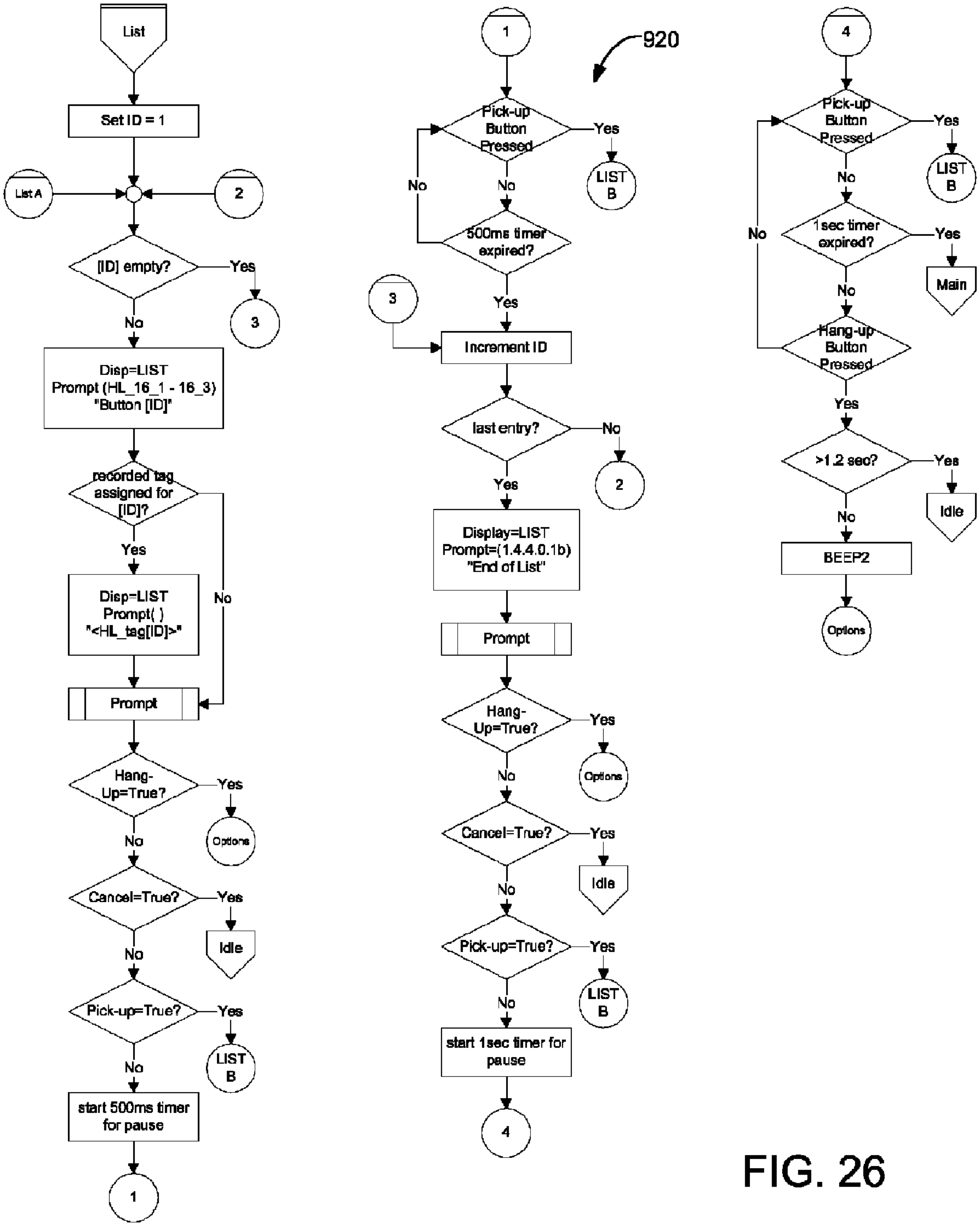
Figure 27:
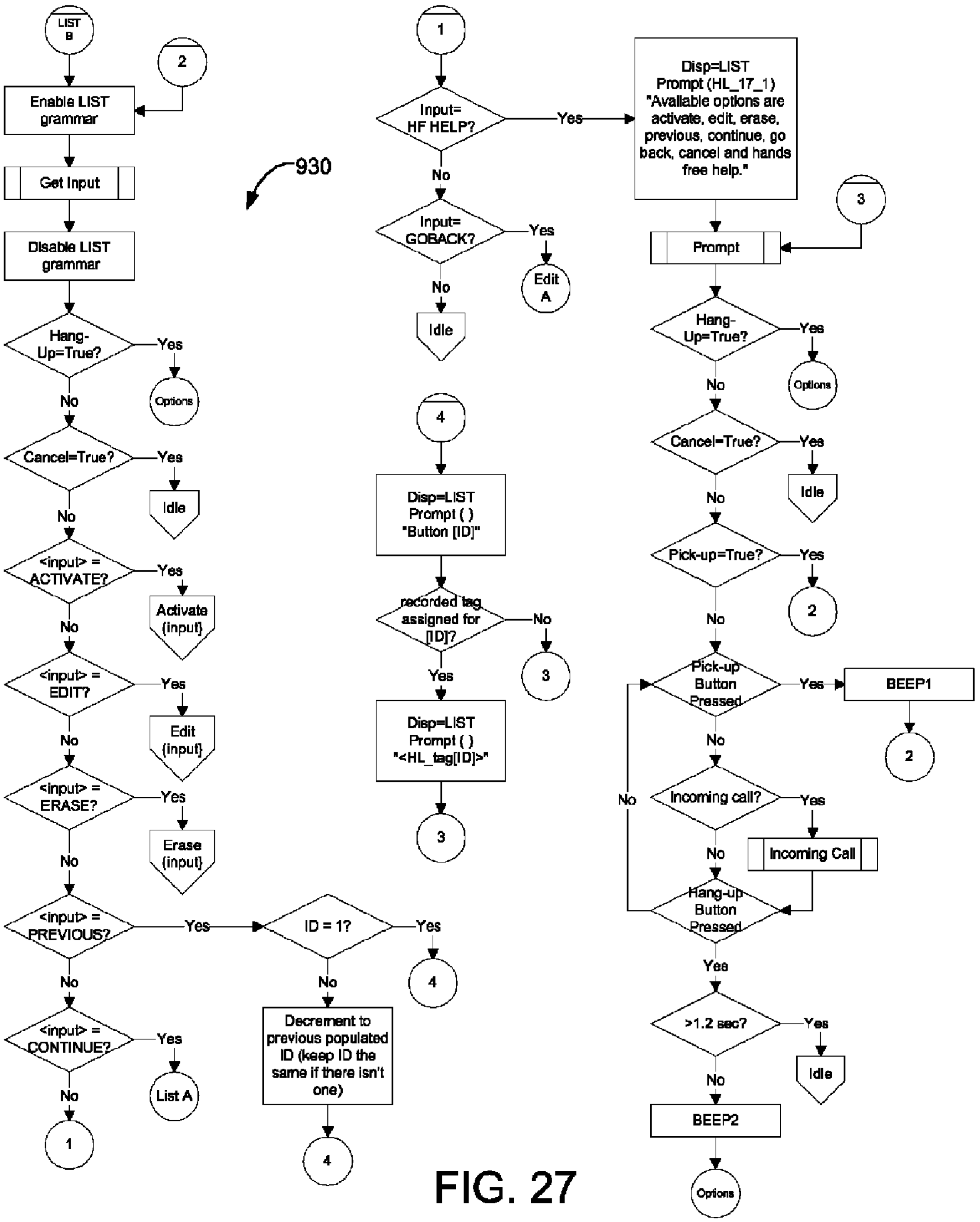
Figure 28:
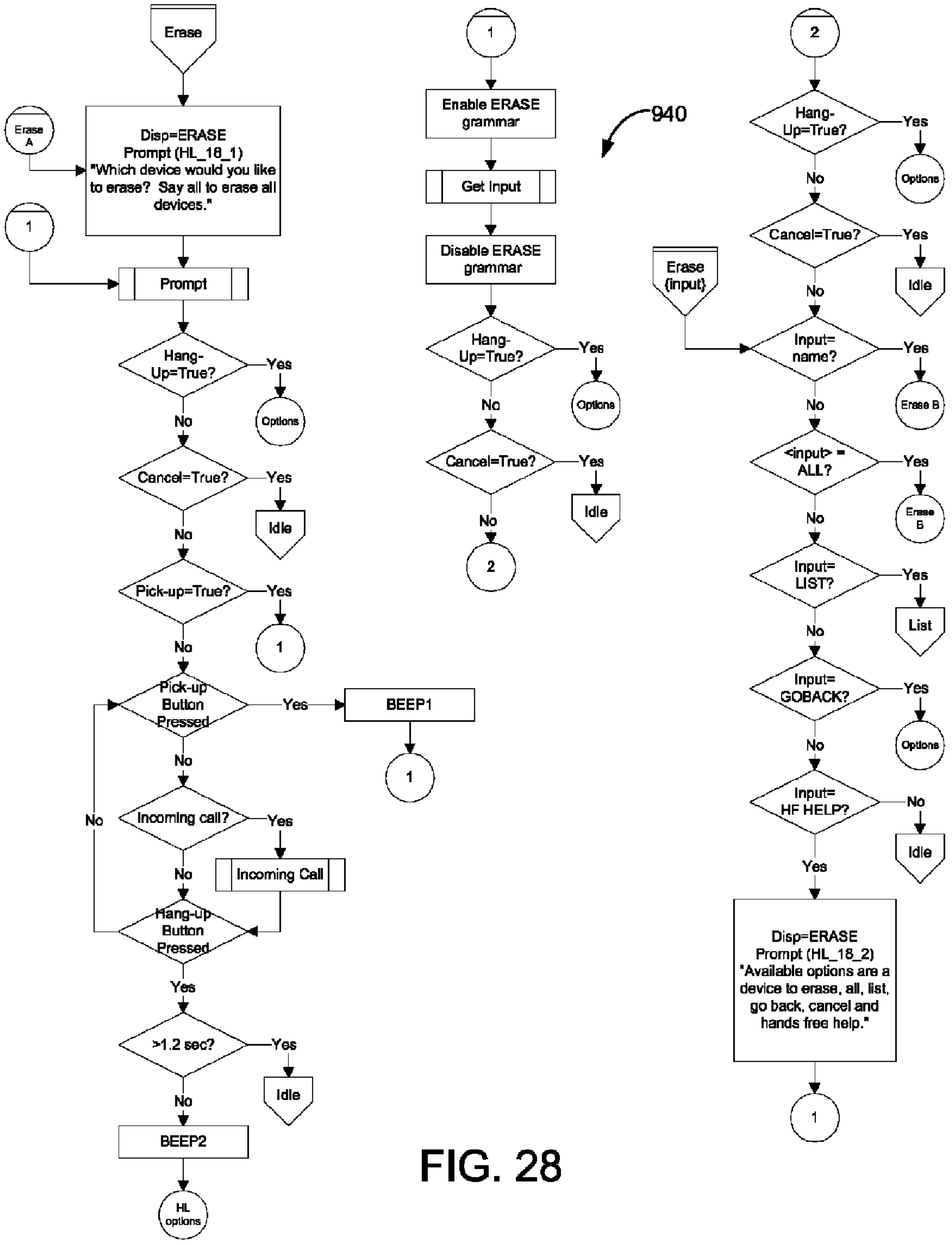
Figure 29:
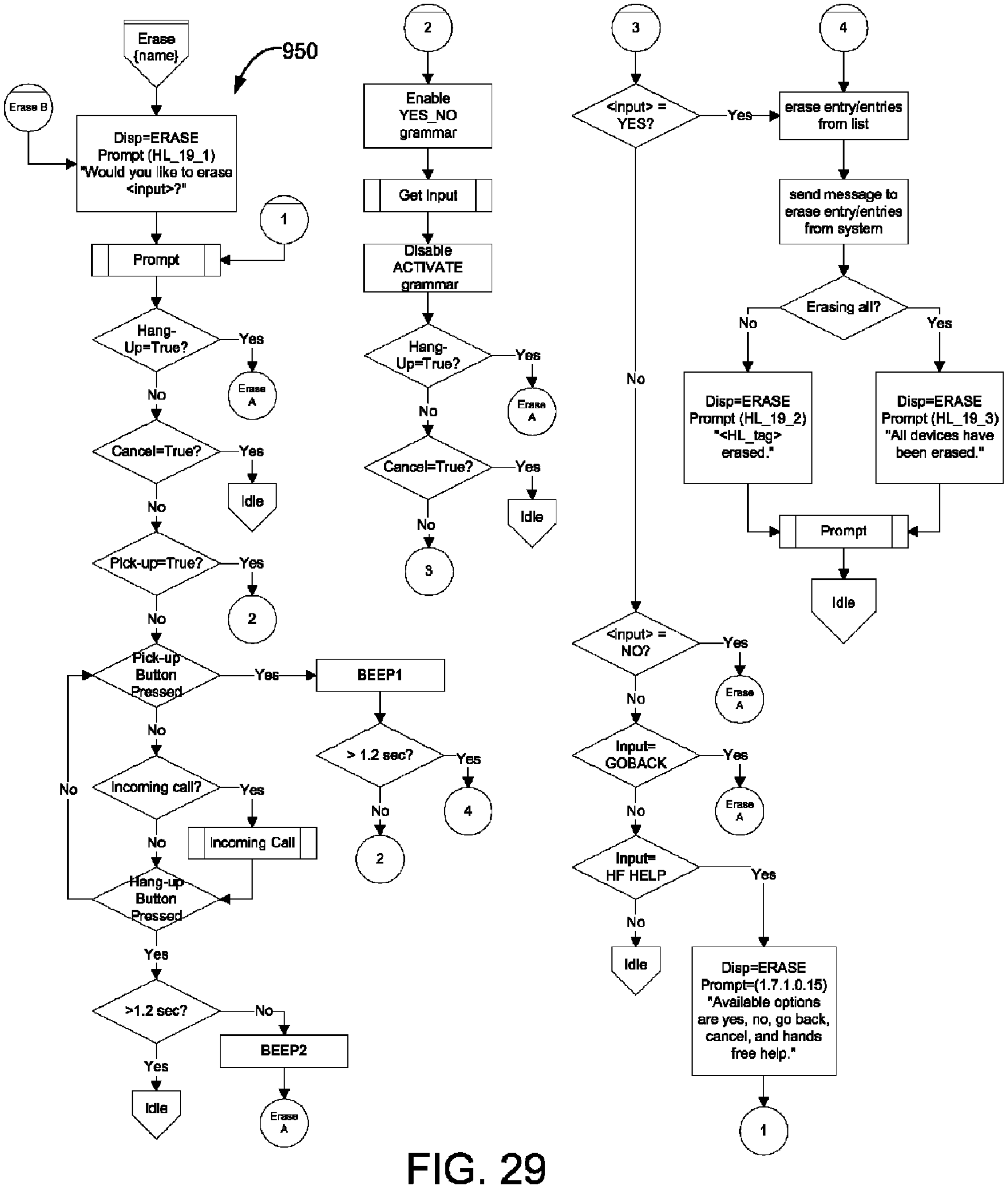

FIG. 9 shows the system carrying out the steps of a method 750 from a main mode. The system 10 may request various input from the system user. In illustrated system modes (as shown in FIGS. 10, 11, 17-18, 20-23) various methods are carried out by the system 10 (e.g., 760, 770, 780, 790, 800, 810, 820, 830). The system 10 has various active modes as well (as shown in FIGS. 12, 13, 14) in which the system is configured to carry out methods 840, 850 and 860. The system also has various "program" modes as shown in FIGS. 15, 16 and 19 that carry out methods 870, 880 and 890.

Other methods are provided with respect to FIGS. 24-29 relating to edit modes, list modes and erase modes (methods 900 and 910 relate to the system edit mode; methods 920 and 930 relate to system lists modes; and methods 940 and 950 relate to system erase modes). Other methods of providing voice prompts for system operation (not shown) are included with the scope of the present application. Methods may be interchangeable between modes so that a method disclosed with respect to one system mode may be carried out in a different system mode.

In another embodiment, the programming sequence runs in a loop so that when the vehicle system includes a plurality of buttons all of the buttons may be programmed sequentially and the user is automatically prompted to program any empty buttons.

The prompt may be received from a remote location and/or stored by the vehicle system 10 (as shown for example in FIG. 3). In one embodiment the prompt is downloaded in memory that is included in the vehicle system 10 (e.g. in system 40 or system 30). In another embodiment, the voice prompts may be transferred to the user interface system over a wireless network (e.g. Bluetooth network) connection. The voice prompts may be transferred as streaming audio in some embodiments. The voice prompts may be transferred as an audio file in some embodiments. The voice prompts may be transferred using any network profile, such as a Bluetooth profile (e.g. a headset profile, hands-free profile, A2DP profile, remote control audio profile, etc.). In another embodiment, the voice prompts may be played using a speaker connected directly to the vehicle system.

In another embodiment, the vehicle system stores the voice prompts and outputs them on a display connected to the vehicle system and/or play them using a speaker connected to the vehicle system. In this embodiment, signals may or may not be transferred using a wireless network (e.g. Bluetooth network) connection. In an alternative embodiment, the voice prompts and outputs may be shown on the display connected to the user interface system.

In one embodiment, the prompt is received from a remote location such as a customer service center designated to assist users with the programming of the vehicle system 10. The vehicle system 10 may include a second receiver or transceiver configured to accept voice prompts from the customer service center. Voice prompts can be sent to the vehicle system 10 using a number of wireless protocols including, but not limited to cellular systems, the Internet, and other long/short range communication systems. In one embodiment, the vehicle system 10 may include a number of voice prompts that are stored within the vehicle system and auxiliary voice prompts may be downloaded and/or played from a remote location.

Another embodiment, directed to a wireless communication system, includes a first transceiver for communicating with devices using a first wireless method. The wireless communication system also includes a second transceiver for communicating with devices using a second wireless method different than the first method.

In some embodiments, the user interface system 40 may be configured to control the vehicle system 10 based on voice commands from a user. In these embodiments, the hands-free system may interpret the voice input from the user and send a command message to the vehicle system 10 over the wireless network (e.g. Bluetooth network) connection based on the interpreted voice input.

One embodiment regards a method of providing audible information related to a vehicle system for use in a vehicle. The method includes receiving a command to provide audible information related to the vehicle system; transmitting data related to audible information using a transmitter configured to send the data via a short-range communication protocol based on the command; receiving the data transmitted by the transmitter using a receiver configured to be in communication with the transmitter; and either playing or displaying audible information based on the data received by the receiver using a user interface configured to be in communication with the receiver.

Another embodiment relates to a method of providing audible information related to a wireless control system. The method includes receiving audible information related to the wireless control system; providing the audible information to a memory unit included in the wireless control system; and providing a user interface configured to play the audible information downloaded to the memory unit.

Another embodiment relates to a method of providing voice prompts related to a wireless control system that may be used in a vehicle. The method includes receiving a voice prompt related to the wireless control system; storing the voice prompt in memory; and providing a user interface configured to play the voice prompt.

In some embodiments, the wireless network (e.g. Bluetooth network) connection may be used to offer enhanced support. For example, the wireless network (e.g. Bluetooth network) module may communicate over a user's wireless network (e.g. Bluetooth network) enabled cell phone, the vehicle system 10 may communicate diagnostic information to a remote site, the vehicle system may receive commands from a remote site, and/or other various features.

In some embodiments, the wireless network (e.g. Bluetooth network) connection provides two-way communication. In some embodiments, the wireless network (e.g. Bluetooth network) connection may only provide one-way communication.

In some embodiments, the wireless network (e.g. Bluetooth network) system may always maintain a connection (e.g. in some of the embodiments using voice commands from the hands-free system to the WCS). In some embodiments, the wireless network (e.g. Bluetooth network) system may not always maintain a connection (e.g. in some of the embodiments that only use voice-aided training)

The Bluetooth standard makes use of the free, universal 2.4 GHz Industrial, Scientific, and Medical (ISM) band and a frequency hopping scheme using 1600 hops/second. Encryption and authentication are built into the Bluetooth standard along with an automatic "output power adaptation" feature that automatically reduces the output power of the RF transceiver to only (and exactly) that amount of power which is needed to accomplish the data transmission.

The specific protocol or standard may be the Bluetooth communications standard or the Shared Wireless Access Protocol-Cordless Access (SWAP-CA) specification, or any other suitable wireless communications specification that enables voice and/or data information to be transmitted between the transmitter and receiver. Accordingly, while the Bluetooth or SWAP-CA specifications may be referenced throughout the discussion of the various preferred embodiments, it should be understood that the claims appended hereto should be not be limited to the use of one or the other of these specifications, or necessarily to any specific communications.

The vehicle system may operate as shown in and/or include a transmitter circuit having any number of structures such as those disclosed in one or more of U.S. Pat. Nos. 5,442,340; 5,479,155; 5,583,485; 5,614,885; 5,614,885; 5,614,891; 5,646,701; 5,661,804; 5,699,054; 5,708,415; 5,854,593; 5,903,226; 6,137,421; 6,703,941; and/or 7,057,494. The disclosures of these U.S. patents is hereby incorporated by reference in their entirety to the extent they are consistent with the reminder of the disclosure of this application. In addition to (or as an alternative to) the structures of the above listed patents, the vehicle system may operate as shown in and/or the transmitter circuit may have a structure such as that disclosed in one or more of U.S. Pat. Pub. Nos. 2006/0217850; 2006/0214813; 2006/0198523; 2006/0181428; 2006/0158344; 2005/0024229; 2004/0110472; 2003/0216139; and/or 2003/0197594. The disclosures of these U.S. patent publications are hereby incorporated by reference in their entirety to the extent they are consistent with the reminder of the disclosure of this application.

The user interface system may operate as disclosed in any of US Pat. Pub. No. 2006/0168627; US Pat. Pub. No. 2005/0090279; US Pat. Pub. No. 2005/0046545; US Pat. Pub. No. 2004/0203379; US Pat. Pub. No. 2004/0110472; US Pat. Pub. No. 2004/0051337; US Pat. Pub. No. 2004/0048622; US Pat. Pub. No. 2003/0228879; and/or US Pat. Pub. No. 2002/0197955. The disclosures of these U.S. patent publications are hereby incorporated by reference in their entirety to the extent they are consistent with the reminder of the disclosure of this application.

Reference to a receiver in the claims may include a receiver, a transceiver, or any other device capable of receiving data. Reference to a transmitter in the claims may include a transmitter, a transceiver, trainable transmitter, trainable transceiver, or any other device capable of transmitting information.

Reference to a display or displaying may include any type of audio/visual display and is not limited to visual displays.

While the exemplary embodiments illustrated in the FIGS. and described above are presently preferred, it should be understood that these embodiments are offered by way of example only. Those skilled in the art can appreciate from the foregoing description that the broad teachings of the present disclosure can be implemented in a variety of forms. Therefore, while this invention has been described in connection with particular examples thereof, the true scope of the claims appended hereto should not be so limited since other modifications will become apparent to the skilled practitioner upon a study of the drawings and the present specification. Moreover, the order or sequence of any process or method steps may be varied or re-sequenced according to alternative embodiments.

What is claimed is:

1. A method of providing audible information related to a wireless control system for use in a vehicle, the method comprising:

transmitting data representative of the audible information using a transmitter coupled to the wireless control system, the transmitter configured to send the data via a short-range communication protocol;

receiving the data transmitted by the transmitter using a receiver coupled to a user interface system wherein the receiver is not wired to the wireless control system, the receiver configured to be in wireless communication with the transmitter;

at least one of playing and displaying the audible information based on the data received by the receiver using the user interface system; and executing instructions stored in a memory of the wireless control system, using a processor, to cause the audible information to be played by the user interface, wherein the audible information comprises interactive user instructions for training the wireless control system to communicate with an electronic device remote from the vehicle.

2. The method of claim 1, wherein the vehicle system comprises a wireless control system configured to wirelessly control an electronic device remote from the vehicle.

3. The method of claim 2, wherein the electronic device includes at least one of a garage door opener, a security system, a lighting module, a home control module, a gate opener, a remote vehicle system and a computer system.

4. The method of claim 1, wherein the short-range communication protocol is Bluetooth.

5. The method of claim 1, wherein the user interface includes at least one of a hands-free system, a display, an audio circuit, a cell phone and a personal data assistant.

6. The method of claim 1, further comprising: controlling the system using voice-activated controls.

7. A method of providing audible information related to a wireless control system for use in a vehicle, the method comprising:

receiving input from a user related to the wireless control system at a wireless control system provided in a vehicle;

providing audible information to a memory unit included in the wireless control system based on the input;

providing a user interface system configured to play the audible information downloaded to the memory unit; and executing instructions stored in the memory unit, using a processor, to cause the audible information to be played by the user interface, wherein the audible information comprises interactive user instructions for training the wireless control system to communicate with an electronic device remote from the vehicle.

8. The method of claim 7, wherein the audible information includes at least one of voice prompts and user instructions.

9. The method of claim 7, further comprising at least one of: prompting a user to play the audible information; and prompting the user to display the audible information.

10. The method of claim 7, wherein the wireless control system comprises a trainable transmitter that is trainable to wirelessly control an electronic device remote from the vehicle.

11. The method of claim 10, wherein the electronic device includes at least one of a garage door opener, a security system, a lighting module, a home control module, a gate opener and a computer system.

12. The method of claim 7, further comprising:

controlling the wireless control system using voice-activated controls.

13. A wireless control system for use in a vehicle comprising:

a wireless control system comprising:

a memory configured to store audible information associated with the wireless control system;

a processing device; and a transmitter coupled to the wireless control system, the transmitter configured for short-range wireless communication, wherein the transmitter is configured to send data representative of the audible information;

a user interface system coupled to the wireless control system through a short-range wireless network comprising:

a receiver configured to communicate with the transmitter to transfer the data wherein the receiver is not wired to the wireless control system;

a user interface coupled to the receiver and configured to play audible information related to operation of the wireless control system based on the data received by the receiver; and wherein the processor in the wireless control system is configured to execute instructions stored in the wireless control system memory to cause the audible information to be played by the user interface, wherein the audible information comprises interactive user instructions for training the wireless control system to communicate with an electronic device remote from the vehicle.

14. The vehicle system of claim 13, wherein the audible information includes at least one of voice prompts and user instructions for the wireless control system.

15. The vehicle system of claim 13, wherein the wireless control system comprises a trainable transmitter configured to wirelessly communicate with an electronic device remote from the vehicle.

16. The vehicle system of claim 15, wherein the electronic device includes at least one of a garage door opener, a security system, a lighting module, a home control module, a gate opener and a computer system.

17. The vehicle system of claim 15, wherein the trainable transmitter is configured to communicate with the electronic device via Bluetooth.

18. The vehicle system of claim 13, wherein the short-range communication protocol is a Bluetooth protocol.

19. The vehicle system of claim 13, wherein the user interface includes at least one of a hands-free system, a display, an audio circuit, a cell phone and a personal data assistant.

20. The vehicle system of claim 13, wherein the vehicle system includes voice-activated controls for the vehicle system.

* * * * *